US007423656B2

(12) United States Patent
Zhao et al.

(10) Patent No.: US 7,423,656 B2
(45) Date of Patent: Sep. 9, 2008

(54) METHOD AND APPARATUS FOR GENERATING MORPHING SEQUENCE

(75) Inventors: Yong Hong Zhao, Singapore (SG); Hong Yang Ong, Singapore (SG); Tiow Seng Tan, Singapore (SG); Yongguan Xiao, Singapore (SG)

(73) Assignee: National University of Singapore, Kent Ridge Cresent (SG)

( * ) Notice: Subject to any disclaimer, the term of this patent is extended or adjusted under 35 U.S.C. 154(b) by 128 days.

(21) Appl. No.: 10/548,763

(22) PCT Filed: Mar. 11, 2004

(86) PCT No.: PCT/SG2004/000051

§ 371 (c)(1),
(2), (4) Date: Sep. 9, 2005

(87) PCT Pub. No.: WO2004/081878

PCT Pub. Date: Sep. 23, 2004

(65) Prior Publication Data

US 2006/0170677 A1 Aug. 3, 2006

Related U.S. Application Data

(60) Provisional application No. 60/453,199, filed on Mar. 11, 2003.

(51) Int. Cl.
*G09G 5/00* (2006.01)

(52) U.S. Cl. ...................................... 345/646; 345/420

(58) Field of Classification Search ................. 345/420, 345/646
See application file for complete search history.

(56) References Cited

U.S. PATENT DOCUMENTS

| 5,590,261 | A | * | 12/1996 | Sclaroff et al. | ............... 345/473 |
| 5,640,522 | A | * | 6/1997 | Warrin | ........................ 715/732 |
| 5,742,291 | A | * | 4/1998 | Palm | ............................. 345/420 |
| 5,748,199 | A | * | 5/1998 | Palm | ............................ 345/473 |
| 5,825,369 | A | * | 10/1998 | Rossignac et al. | ........... 345/440 |

(Continued)

OTHER PUBLICATIONS

T. Kanai et al., "Metamorphosis of Arbitrary Triangular Meshes", IEEE Computer Graphics and Applications, vol. 20, No. 2, Mar./Apr. 2000, pp. 62-75, http://ibm.tju.edu.cn/resource/ComputerGraphicsApplication/ComputerGraphicsApplication/2000/g2/g2062.pdf.

(Continued)

*Primary Examiner*—Kee M. Tung
*Assistant Examiner*—David H Chu
(74) *Attorney, Agent, or Firm*—Foley & Lardner LLP

(57) ABSTRACT

A method of generating a morphing sequence utilizing a computer, the method comprising the step of user-defining respective components in a source object and a target object respectively, wherein each component comprises a plurality of local features of respective source and target meshes representing the source and target objects, and user-defining corresponding components between the source object and the target object. The method may further comprise the step of computer-deducing correspondences between components in the source and target objects based on the user-defined correspondences between other components.

54 Claims, 14 Drawing Sheets

U.S. PATENT DOCUMENTS

| | | | |
|---|---|---|---|
| 6,345,244 B1* | 2/2002 | Clark | 704/2 |
| 6,374,224 B1* | 4/2002 | Horiguchi et al. | 704/266 |
| 6,512,995 B2* | 1/2003 | Murao | 702/167 |
| 6,525,744 B1* | 2/2003 | Poggio et al. | 345/619 |
| 6,836,554 B1* | 12/2004 | Bolle et al. | 382/116 |
| 6,906,732 B1* | 6/2005 | Li et al. | 345/646 |
| 2002/0075261 A1* | 6/2002 | Brokenshire et al. | 345/420 |
| 2002/0087329 A1* | 7/2002 | Massaro et al. | 704/275 |
| 2003/0043153 A1* | 3/2003 | Buddemeier et al. | 345/473 |
| 2003/0154189 A1* | 8/2003 | Egilsson et al. | 707/1 |
| 2006/0173357 A1* | 8/2006 | Vilsmeier et al. | 600/476 |

OTHER PUBLICATIONS

M. Alexa, "Local Control for Mesh Morphing", Proc. Int. Conference on Shape Modeling & Applications, May 7-11, 2001, pp. 209-215 http://www.dgm.informatik.tu-darmstadt.de/pub/smi01.pdf.

M. Alexa et al., "As-rigid-as-possible Shape Interpolation", Siggraph, pp. 157-164, 2000.

D. Decarlo et al., "Topological Evolution of Surfaces", Graphics Interface, 194-203, 1996.

A. Gregory et al., "Feature based Surface Decomposition for Correspondence and Morphing between Polyhedra", Computer Animation, pp. 64-71, 1998.

T. Kanai et al, "Metamorphosis of Arbitrary Triangular Meshes", IEEE CG&A, pp. 62-75, 2000.

X.T. Li et al., "Decomposing Polygon Meshes for Interactive Applications", 13DG, pp. 35-42, 2001.

A Verroust et al., "Extracting Skeletal Curves from 3D Scattered Data", Shape Modeling International, v16, pp. 194-201.

M. Zockler et al., "Fast and Intuitive Generation of Geometric Shape Transitions", Visual Computer, v16, pp. 241-253, 2000.

* cited by examiner (a)

(b)

(c)

(d)

(e)

(f)

METHOD AND APPARATUS FOR GENERATING MORPHING SEQUENCE

FIELD OF THE INVENTION

The presented invention relates generally to computer graphics, and more particularly, to methods and apparatuses for interactive user control in generating morphing sequences of 3D polygonal meshes.

BACKGROUND OF THE INVENTION

Morphing (or metamorphosis) of polygonal meshes involves the creation of a smooth transition from a source mesh to a target mesh. For two meshes, there are numerous ways to transform one to the other. Algorithms for morphing are mainly evaluated by criteria related to the ease of user control and the visual quality of morphing sequence. Morphing is such an aesthetic problem that fully automatic methods cannot meet all the needs that arise in all applications. Therefore, user interaction is important and unavoidable.

A mesh morphing process basically consists of two steps: establishing the correspondence where each vertex of a source mesh is mapped to a vertex of a target mesh, and calculating the interpolation where trajectories are defined for all corresponding vertices.

Current morphing works usually concentrate on the computational issues and overlook the interactive process of specifying and modifying user requirements. To date, there is still no good scheme to make user interaction intuitive, flexible and efficient. For example, to pair a leg of a duck with a leg of a dinosaur as corresponding, users generally have to express such a requirement in terms of many low-level vertex correspondences. Such a way of specifying correspondence is usually neither intuitive nor natural, especially when two original meshes are very different in shapes.

There is therefore a need to provide a method and system for generating morphing sequences, which can facilitate a more intuitive user interaction.

SUMMARY

In accordance with a first aspect of the present invention there is provided a method of generating a morphing sequence utilising a computer, the method comprising the step of user-defining respective components in a source object and a target object respectively, wherein each component comprises a plurality of local features of respective source and target meshes representing the source and target objects, and user-defining corresponding components between the source object and the target object.

The method may comprise the step of computer-deducing correspondences between components in the source and target objects based on the user-defined correspondences between other components.

The step of computer-deducing the correspondences may comprise the step of maintaining a data structure in a data storage medium representing information on decompositions and on connectivities between components in the source and target objects respectively.

The method may comprise the step of maintaining data representing the user-defined correspondences between components in a constraint tree structure.

The method may further comprise the step of computer-deducing extensions to the constraint tree structure to a point where each leaf of the constraint tree structure comprises data representing a single pair of corresponding components and an associated single pair of corresponding connections in the source and target meshes respectively. One or more of the single pairs of corresponding components and corresponding connections may comprise null-elements as one of the elements of the pair.

The method may further comprise the step of presenting candidate components correspondences based on the pairs of corresponding components in the leaves of the constraint tree structure to the user.

The method may further comprise the step of computer-generating data representing a common connectivity graph for the source and target object pair based on the pairs of corresponding components and the associated pairs of connections in the leaves of the constraint tree structure. In the common connectivity graph, each node may represent a single pair of corresponding components, and each edge may represent a single pair of connections.

The method may further comprise the step of computer-deriving correspondences of a series of local features based on the data representing the common connectivity graph.

The method may comprise the step of user-defining a section of the source object as corresponding to a section of the target object, wherein the respective sections extend over at least portions of two or more components of the source and target objects respectively. The method may further comprise the step of computer-deriving correspondences of the components in the source and target object respectively based on the user-defined correspondences of the sections of the source and target objects respectively.

The local features may comprise one or more of a group comprising a mesh vertex, a mesh line, and a mesh loop.

The step of providing the candidate counterparts may comprise identifying components in the target object that exhibit a substantially similar connectivity to other components in the target object compared to the user-selected component in the source object to other components in the source object.

One component in the source object may be user-defined as corresponding to a plurality of components of the target object, and vice versa.

Respective components in the source and target objects may comprise a group of polygons in the respective source and target meshes.

The component decompositions of the source and target meshes can be obtained automatically via decomposing tools or manually via interactive system tools of cutting component with a cutting plane, selecting triangles to form a new component, passing triangles to a neighboring component, and merging connected components into one.

A rule of processing constraints in the constraint tree structure may comprise conducting the steps of:

Given a (P, Q) corresponding to a constraint (X, Y), where $P=G(X, E)$, $Q=G(Y, F)$, $X \subseteq V_S$, $Y \subseteq V_T$, $E \subseteq E_S$ and $F \subseteq E_T$, partition each $(P_i, Q_i)$ of the current correspondence set □ into $(P_i', Q_i')$ and $(P_i'', Q_i'')$, where $P_i'=P \cap P_i$, $Q_i'=Q \cap Q_i$, $P_i''=P_i-P_i'$ and $Q_i''=Q_i-Q_i'$. p In the step of constraint processing may comprise the steps of, whenever a partitioning of $(P_i, Q_i)$ is performed upon the specification of a new constraint, update the constraint tree structure by creating a left child and a right child for the node representing $(P_i, Q_i)$, which correspond to the new correspondences $(P_i', Q_i')$ and $(P_i'', Q_i'')$ respectively.

The method may further comprise one or more of a group of modification steps to the constraint tree structure comprising:

undoing a specific constraint with all other constraints unaffected;

splitting components during the process of specifying component correspondences; and merging components during the process of specifying component correspondences.

The step of undoing a specific, $i^{th}$, constraint may comprise merging the two respective left (right, respectively) subtrees of every pair of two nodes at level i with the same parent to be the new left (right, respectively) subtree of $n_p$.

The step of splitting a component into two may comprise the steps of:
finding the leaf that contains the component to be split;
replacing it with two new components; and
updating connections accordingly.

The step of merging two connected components into one may comprise the steps of:
while there exists a constraint that cause the separation of the two components
locate the leaves containing the two components to be merged;
search upward from the leaf level to find their nearest common ancestor; and
remove the constraint that is represented by the level below this common ancestor via the undoing step;
replace the components to be merged with the new component and update connections accordingly.

The method may comprise the step of identifying candidates for user-selected sections comprising the steps of:
within each leaf of the constraint tree, organize its components into groups of maximally connected components;
for each user-selected component in one connectivity graph
locate the leaf containing this component;
within the leaf, find the group of maximally connected components that is similar in connectivity to the group containing the component; and
add all components in the found group into the list of candidates.

The method may further comprise the steps of:
user-specifying local-level correspondences for a pair of corresponding components from the computed said complete component correspondence;
computer-deducing local feature correspondences within a component pair; and
computing the complete vertex correspondence to associate vertices of the said meshes.

A user may specify different kinds of local features including feature vertices, feature lines and feature loops within a pair of corresponding components:

The step of deducing local feature pairs may comprise the steps of:
deducing implied local feature pairs from user specification; and
deducing-assumed local feature pairs where appropriate.

The step of deducing implied local feature pairs may further comprise:
deducing local feature pairs from complete component correspondences; and/or
deducing local feature pairs upon user specification of local feature pairs.

The step of deducing local feature pairs from the complete component correspondence may comprise pairing up two component boundaries whenever they are represented by two connections in a correspondence edge in M.

The step of deducing local feature pairs upon user specification of local feature pairs may comprise duplicating two local features in two corresponding components in the neighboring components to form another local feature pair when the two local features are both specified at boundaries and the two neighbors at these two boundaries are also corresponding.

The step of deducing assumed local feature pairs may further comprise one or more steps of a group comprising:
deducing pairs of tip vertices;
deducing feature vertex pairs at corresponding feature loops; and
deducing feature loop pairs at component boundaries.

The step of deducing pairs of tip vertices may comprise locating and pairing the tip vertices of two corresponding components when the two components each have only one boundary.

The step of deducing feature vertex pairs at corresponding feature loops may comprise:
in a component pair $(c_s, c_t)$, for each two corresponding feature loops $l_s$ and $l_t$ having at most one feature vertex pair on them,
for $l_s$, locate its nearest local feature $l_s'$ on $c_s$;
let $v_s$ be the vertex of $l_s$ on the shortest path from $l_s$ to $l_s'$, $l_t'$ be the corresponding local feature of $l_s'$ on $c_t$, and $v_t$ be the vertex of $l_t$ on the shortest path from $l_t$ to $l_t'$;
pair up $v_s$ and $v_t$; and
pair up the two vertices on the boundaries farthest away from (or opposite to) $v_s$ and $v_t$ respectively.

The step of deducing feature loop pairs at component boundaries may comprise, if there is more than one connection between two components in a mesh and the same between their corresponding components in the other mesh, and when the user specifies correspondences between some of their boundaries, assuming the correspondences for the remaining boundaries by re-computing the common connectivity graph M.

The step of computing the complete vertex correspondence may comprise the steps of:
automatically partitioning two corresponding components into compatible patch layouts when neither component is a null-component;
automatically handling the case where a component pair contains a null-component; and
establishing the common mesh connectivity of the said two input meshes by parameterizing them according to their said compatible patch layouts.

The automatic patch partitioning for two corresponding components may comprise the steps of:
organizing all local features of each component into maximally connected groups of local features;
constructing a minimum spanning tree (MST) to connect all the feature groups in one component;
constructing another MST to connect all the feature groups in the leaf nodes of the MST;
partitioning the component with two MSTs into patches; and
partitioning the other component into patches according to local feature correspondences.

The automatic handling of each component pair containing a null-component patch may comprise the steps of:
for the component pair $(c_s, c_t)$ where without loss of generality, assume $c_s \neq \zeta_v$, $c_t = \zeta_v$, $c_s'$ connects $c_s$ at boundary $l_s$, $c_s' \neq \zeta_v$, and $(c_s', c_t')$ is a component pair;
if $c_t' \neq \zeta_v$, and the user assign a local feature $l_t$ in $c_t'$ to be the counterpart of $l_s$,
create the mesh connectivity of a new component c by copying the topology of $c_s$;

for each vertex pair $(v_s, v_t)$ where $v_s$ is from $c_s$ and $v_t$ is from c if $v_s$ is at $l_s$, $v_t$ is already a vertex of $l_t$;

otherwise, $v_t$ is set at the position of v where (u, v) is a vertex pair and u is the boundary vertex closest to $v_s$;

replace $c_t$ with c;

otherwise merge $c_s$ into $c_s'$.

The step of establishing the common mesh connectivity may comprise plugging into several available parameterization methods, for example, topological merging via barycentric mapping, or multi-resolution re-meshing.

The method may further comprise the step of interpolating vertices of the source and target meshes. The step of interpolation may comprise the steps of:

user-editing trajectories of the said components by operating on each component as a whole;

user-editing trajectories of vertices by changing their positions; and computing the interpolation for mesh vertices.

The step of user-editing the trajectory of a component may comprise the steps of:

a user assigning a bone for each said component, either automatically or manually, and the bones of all components in each mesh form a skeleton;

establishing the common skeleton for the skeleton of one said input mesh and that of the other said input mesh according to the common connectivity graph M;

computing the morph between the two skeletons;

binding mesh vertices of the component to the bone using arc-length values and relative positions of the vertices with respect to their nearest points on the bone;

the user operating on the position of the bone at an intermediate frame; and saving the new position as a keyframe of the component and update positions of mesh vertices in the morph.

The step of editing trajectories of vertices may comprise first saving a user-specified vertex position at an intermediate frame as a new vertex keyframe containing the said arc-length value and relative position and then interpolating the arc-length values and relative positions between keyframes.

In accordance with a second aspect of the present invention there is provided a system for generating a morphing sequence, the system comprising a user-interface for user-defining respective components in a source object and a target object respectively, wherein each component comprises a plurality of local features of respective source and target meshes representing the source and target objects, and for user-defining corresponding components between the source object and the target object.

The system may comprise a processor unit for computer-deducing correspondences between components in the source and target objects based on the user-defined correspondences between other components.

The processor unit may computer-deduce the correspondences by maintaining a data structure in a data storage medium of the system representing information on decompositions and on connectivities between components in the source and target objects respectively.

The processor unit may maintain data representing the user-defined correspondences between components and connectivities in a constraint tree structure.

The processor unit may further deducing extensions to the constraint tree structure to a point where each leaf of the constraint tree structure comprises data representing a single pair of corresponding components and an associated single pair of corresponding connections in the source and target meshes respectively. One or more of the single pairs of corresponding components and corresponding connections may comprise null-elements as one of the elements of the pair.

The processor unit may further present candidate components correspondences based on the pairs of corresponding components in the leaves of the constraint tree structure to the user.

The processor unit may further generate data representing a common connectivity graph for the source and target object pair based on the pairs of corresponding components and the associated pairs of connections in the leaves of the constraint tree structure. In the common connectivity graph, each node may represent a single pair of corresponding components, and each edge may represent a single pair of connections.

The processor unit may further derive correspondences of a series of local features based on the data representing the common connectivity graph.

The user-interface may further be arranged for user-defining a section of the source object as corresponding to a section of the target object, wherein the respective sections extend over at least portions of two or more components of the source and target objects respectively. The processor may further derive correspondences of the components in the source and target object respectively based on the user-defined correspondences of the sections of the source and target objects respectively.

The local features may comprise one or more of a group comprising a mesh vertex, a mesh line, and a mesh loop.

The processor unit may provide the candidate counterparts by identifying components in the target object that exhibit a substantially similar connectivity to other components in the target object compared to the user-selected component in the source object to other components in the source object.

One component in the source object may be user-defined as corresponding to a plurality of components of the target object, and vice versa.

Respective components in the source and target objects may comprise a group of polygons in the respective source and target meshes.

The user-interface may comprise interactive system tools of cutting component with a cutting plane, selecting triangles to form a new component, passing triangles to a neighboring component, and merging connected components into one.

A rule of processing constraints in the constraint tree structure may comprise conducting the steps of:

Given a (P, Q) corresponding to a constraint (X, Y), where $P=G(X, E)$, $Q=G(Y, F)$, $X \subseteq V_S$, $Y \subseteq V_T$, $E \subseteq E_S$ and $F \subseteq E_T$, partition each $(P_i, Q_i)$ of the current correspondence set $\square$ into $(P_i', Q_i')$ and $(P_i'', Q_i'')$, where $P_i'=P \cap P_i$, $Q_i'=Q \cap Q_i$, $P_i''=P_i-P_i'$ and $Q_i''=Q_i-Q_i'$.

The step of constraint processing by the processor unit may comprise the steps of, whenever a partitioning of $(P_i, Q_i)$ is performed upon the specification of a new constraint, update the constraint tree structure by creating a left child and a right child for the node representing $(P_i, Q_i)$, which correspond to the new correspondences $(P_i', Q_i')$ and $(P_i', Q_i'')$ respectively.

The processor unit may further perform one or more of a group of modification steps to the constraint tree structure comprising:

undoing a specific constraint with all other constraints unaffected;

splitting components during the process of specifying component correspondences; and merging components during the process of specifying component correspondences.

The step of undoing a specific, $i^{th}$, constraint may comprise merging the two respective left (right, respectively) subtrees of every pair of two nodes at level i with the same parent to be the new left (right, respectively) subtree of $n_p$.

The step of splitting a component into two may comprise the steps of:
  finding the leaf that contains the component to be split;
  replacing it with two new components; and
  updating connections accordingly.

The step of merging two connected components into one may comprise the steps of:
  while there exists a constraint that cause the separation of the two components
  locate the leaves containing the two components to be merged;
  search upward from the leaf level to find their nearest common ancestor; and
  remove the constraint that is represented by the level below this common ancestor via the undoing step;
  replace the components to be merged with the new component and update connections accordingly.

The processor unit may identify candidates for user-selected sections by performing the steps of:
  within each leaf of the constraint tree, organize its components into groups of maximally connected components;
  for each user-selected component in one connectivity graph locate the leaf containing this component;
  within the leaf, find the group of maximally connected components that is similar in connectivity to the group containing the component; and
  add all components in the found group into the list of candidates.

The user-interface may be arranged for user-specifying local-level correspondences for a pair of corresponding components from the computed said complete component correspondence; and the processor unit may be arranged for computer-deducing local feature correspondences within a component pair; and computing the complete vertex correspondence to associate vertices of the said meshes.

The user-interface may be arranged for user-specifying different kinds of local features including feature vertices, feature lines and feature loops within a pair of corresponding components.

The processor may deduce local feature pairs by performing the steps of:
  deducing implied local feature pairs from user specification; and
  deducing assumed local feature pairs where appropriate.

The step of deducing implied local feature pairs may further comprise:
  deducing local feature pairs from complete component correspondences; and/or
  deducing local feature pairs upon user specification of local feature pairs.

The step of deducing local feature pairs from the complete component correspondence may comprise pairing up two component boundaries whenever they are represented by two connections in a correspondence edge in M.

The step of deducing local feature pairs upon user specification of local feature pairs may comprise duplicating two local features in two corresponding components in the neighboring components to form another local feature pair when the two local features are both specified at boundaries and the two neighbors at these two boundaries are also corresponding.

The step of deducing assumed local feature pairs may further comprise one or more steps of a group comprising:
  deducing pairs of tip vertices;
  deducing feature vertex pairs at corresponding feature loops; and
  deducing feature loop pairs at component boundaries.

The step of deducing pairs of tip vertices may comprise locating and pairing the tip vertices of two corresponding components when the two components each have only one boundary.

The step of deducing feature vertex pairs at corresponding feature loops may comprise:
  in a component pair $(c_s, c_t)$, for each two corresponding feature loops $l_s$ and $l_t$ having at most one feature vertex pair on them,
  for $l_s$, locate its nearest local feature $l_s'$ on $c_s$;
  let $v_s$ be the vertex of $l_s$ on the shortest path from $l_s$ to $l_s'$, $l_t'$ be the corresponding local feature of $l_s'$ on $c_t$, and $v_t$ be the vertex of $l_t$ on the shortest path from $l_t$ to $l_t'$;
  pair up $v_s$ and $v_t$; and
  pair up the two vertices on the boundaries farthest away from (or opposite to) $v_s$ and $v_t$ respectively.

The step of deducing feature loop pairs at component boundaries may comprise, if there is more than one connection between two components in a mesh and the same between their corresponding components in the other mesh, and when the user specifies correspondences between some of their boundaries, assuming the correspondences for the remaining boundaries by re-computing the common connectivity graph M.

The processor may compute the complete vertex correspondence by performing the steps of:
  automatically partitioning two corresponding components into compatible patch layouts when neither component is a null-component;
  automatically handling the case where a component pair contains a null-component; and
  establishing the common mesh connectivity of the said two input meshes by parameterizing them according to their said compatible patch layouts.

The automatic patch partitioning for two corresponding components may comprise the steps of:
  organizing all local features of each component into maximally connected groups of local features;
  constructing a minimum spanning tree (MST) to connect al the feature groups in one component;
  constructing another MST to connect all the feature groups in the leaf nodes of the MST;
  partitioning the component with two MSTs into patches; and
  partitioning the other component into patches according to local feature correspondences.

The automatic handling of each component pair containing a null-component patch may comprise the steps of:
  for the component pair $(c_s, c_t)$ where without loss of generality, assume $c_s \neq \zeta_v$, $c_t = \zeta_v$, $c_s'$ connects $c_s$ at boundary $l_s$, $c_s' \neq \zeta_v$, and $(c_s', c_t')$ is a component pair;
  if $c_t' \neq \zeta_v$, and the user assign a local feature $l_t$ in $c_t'$ to be the counterpart of $l_s$,
  create the mesh connectivity of a new component c by copying the topology of $c_s$;
  for each vertex pair $(v_s, v_t)$ where $v_s$ is from $c_s$ and $v_t$ is from c
    if $v_s$ is at $l_s$, $v_t$ is already a vertex of $l_t$;
    otherwise, $v_t$ is set at the position of v where (u, v) is a vertex pair and u is the boundary vertex closest to $v_s$;
  replace $c_t$ with c;
  otherwise merge $c_s$ into $c_s'$.

The processor may establish the common mesh connectivity by plugging into several available parameterization methods, for example, topological merging via barycentric mapping, or multi-resolution re-meshing.

The system may further be arranged for interpolating vertices of the source and target meshes. The step of interpolation may comprise the steps of:

user-editing trajectories of the said components by operating on each component as a whole;

user-editing trajectories of vertices by changing their positions; and computing the interpolation for mesh vertices.

The step of user-editing the trajectory of a component may comprise the steps of:

a user assigning a bone for each said component, either automatically or manually, and the bones of all components in each mesh form a skeleton;

establishing the common skeleton for the skeleton of one said input mesh and that of the other said input mesh according to the common connectivity graph M;

computing the morph between the two skeletons;

binding mesh vertices of the component to the bone using arc-length values and relative positions of the vertices with respect to their nearest points on the bone;

the user operating on the position of the bone at an intermediate frame; and saving the new position as a keyframe of the component and update positions of mesh vertices in the morph.

The step of editing trajectories of vertices may comprise first saving a user-specified vertex position at an intermediate frame as a new vertex keyframe containing the said arc-length value and relative position and then interpolating the arc-length values and relative positions between keyframes.

In accordance with a third aspect of the present invention there is provided a data storage medium having stored thereon computer readable code means for instructing a computer to execute a method of generating a morphing sequence, the method comprising the step of user-defining respective components in a source object and a target object respectively, wherein each component comprises a plurality of local features of respective source and target meshes representing the source and target objects, and user-defining corresponding components between the source object and the target object.

BRIEF DESCRIPTION OF THE DRAWINGS

The presented invention will become more fully understood from the detailed description given hereinafter and the accompanying drawings which are given by way of illustration only, and thus are not limitative of the present invention, and wherein.

DESCRIPTION

Figure 1:
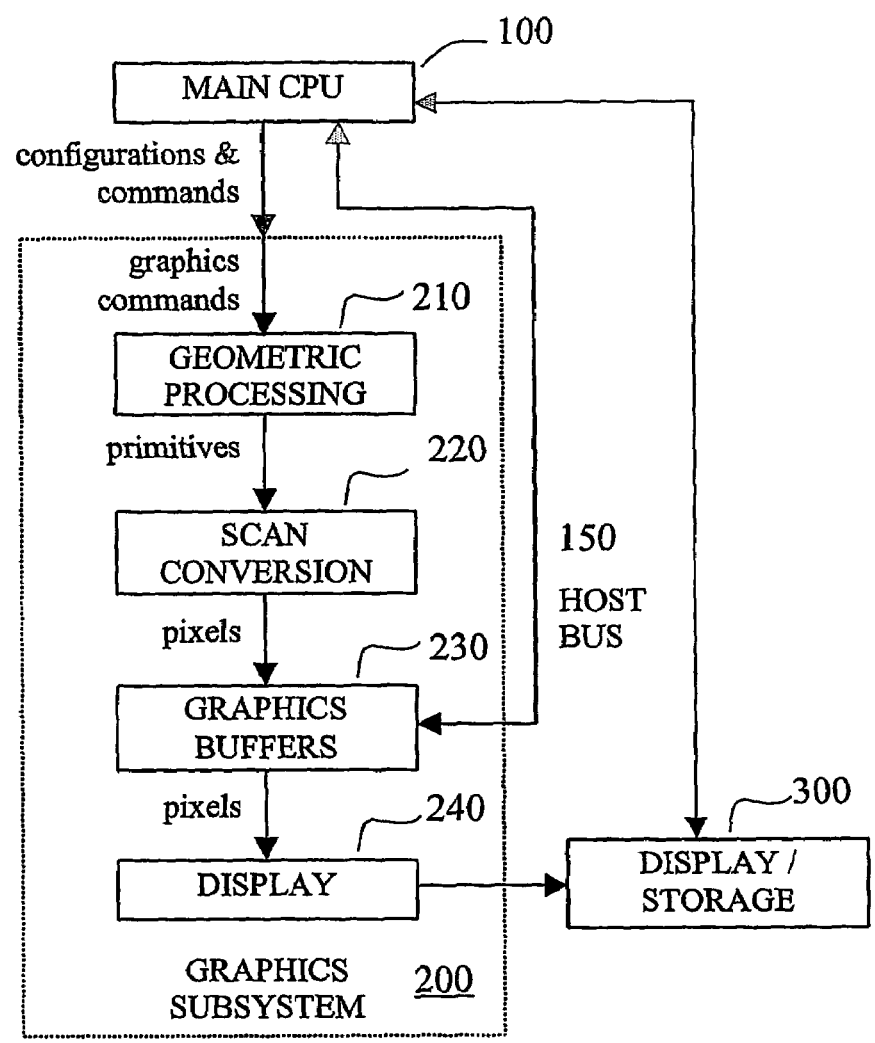
FIG. 1 is a block diagram of an exemplary raster graphics system.

FIG. 1 illustrates an exemplary raster graphics system that includes a main (Host) processor unit 100 and a graphics subsystem 200. The Host processor 100 executes an application program and dispatches graphics tasks to the graphics subsystem 200. The graphics subsystem 200 outputs to a display/storage device 300 connected thereto.

The graphics subsystem 200 includes a pipeline of several components that perform operations necessary to prepare geometric entities for display on a raster display/storage device 300. For the purposes of describing the invention, a model of the graphics subsystem is employed that contains the following functional units. It should be realized that this particular model is not to be construed in a limiting sense upon the practice of the invention.

A Geometric Processor unit 210 performs geometric and perspective transformations, exact clipping on primitives against screen (window) boundaries, as well as lighting computations. The resulting graphics primitives, e.g. points, lines, triangles, etc., are described in screen space (integral) coordinates.

A Scan Conversion (Rasterization) unit 220 receives the graphics primitives from the geometric processor unit 210. Scan converter unit 220 breaks down the graphics primitives into raster information, i.e. a description of display screen pixels that are covered by the graphics primitives.

A Graphics Buffer unit 230 receives, stores, and processes the pixels from the Scan Conversion unit 220. The graphics buffer unit 230 may utilize conventional image buffers and a z-buffer to store this information.

A Display Driver unit 240 receives pixels from the Graphics Buffer unit 230 and transforms these pixels into information displayed on the output display device 300, typically a raster screen.

Figure 2:
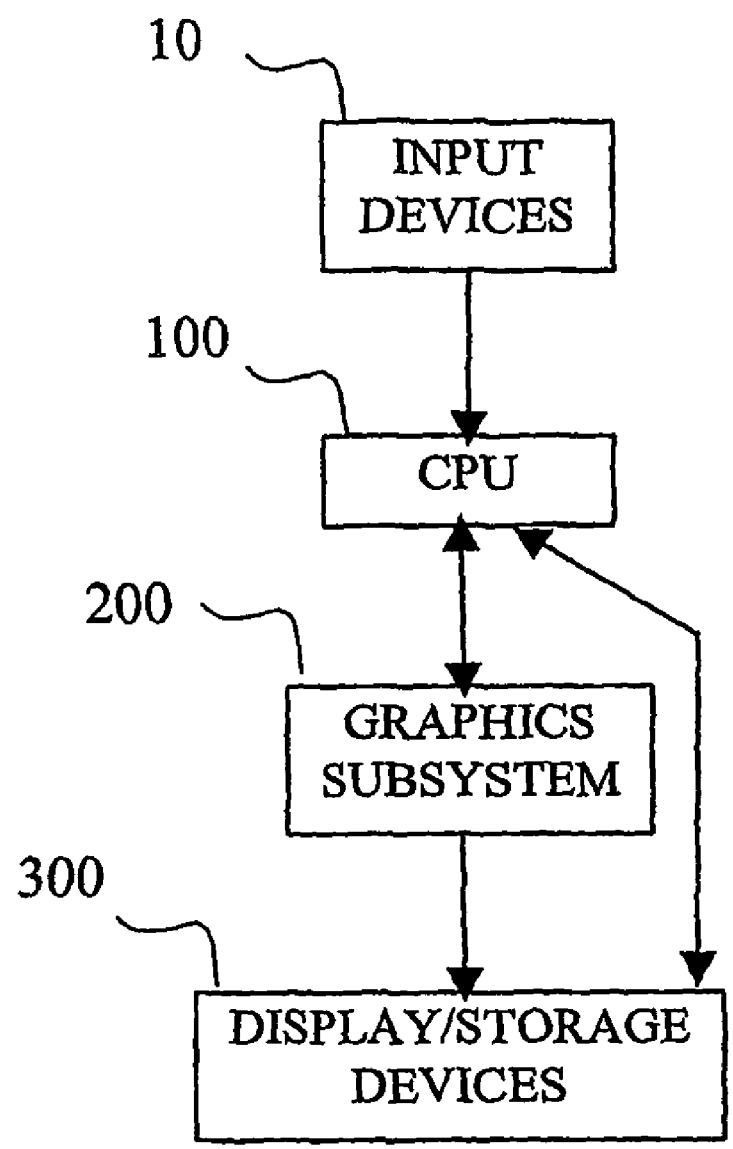
FIG. 2 is a simplified diagram of a graphics processing system according to an embodiment of the invention.

FIG. 2 is a simplified diagram of a graphics processing system according to the invention. An input device 10 inputs graphics data to be processed by the invention. The CPU 100 processes the input data from input devices 10 by executing an application program. CPU 100 also dispatches graphics tasks to the graphics subsystem 200 connected thereto. The output results (morphing sequences or morphs) may then be stored and/or displayed by display/storage devices 300.

Having described an exemplary graphics processing system that is suitable for use in practicing the invention, a description is now provided of a method of generating morphing sequence from a pair of polygon meshes. This is extendable to generating morphing sequence among three or more polygon meshes.

For the purpose of describing the embodiment of invention, it is assumed that objects are described in polygonal boundary representations (b-reps). Models with curved surfaces are tessellated, i.e. approximated with planar triangles. This is to facilitate display as well as other operations that will be described in the following sections.

Figure 3:
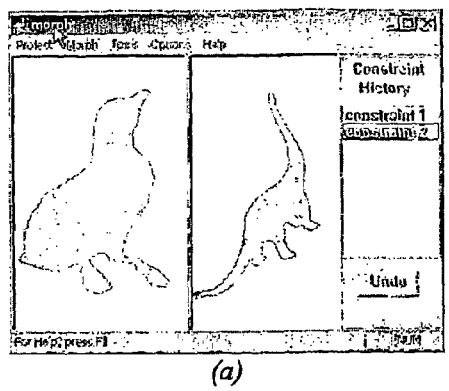
FIG. 3 is an example of user control in the embodiment of the invention.
Figure 3:
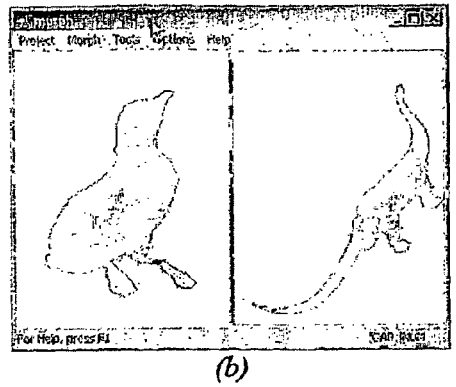
Figure 3:
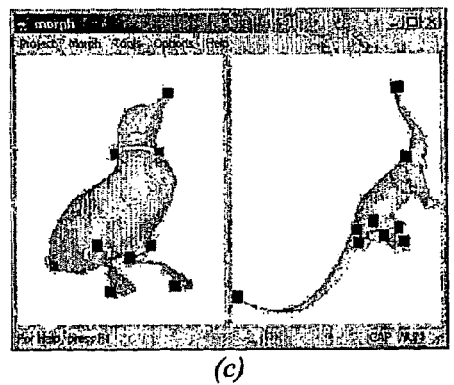
Figure 3:
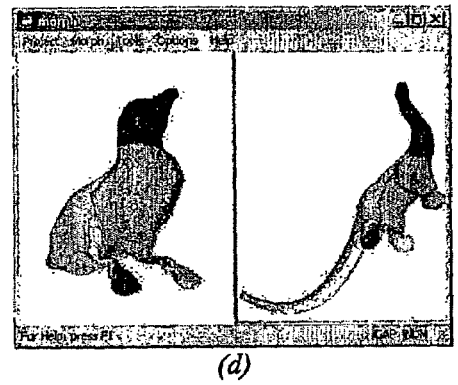
Figure 3:
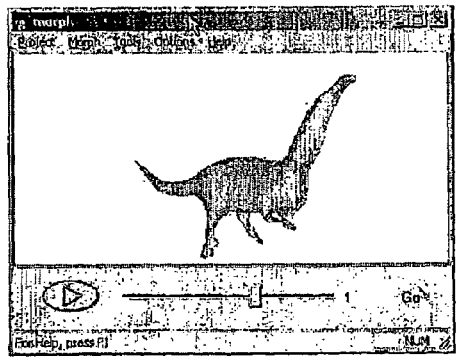
Figure 3:
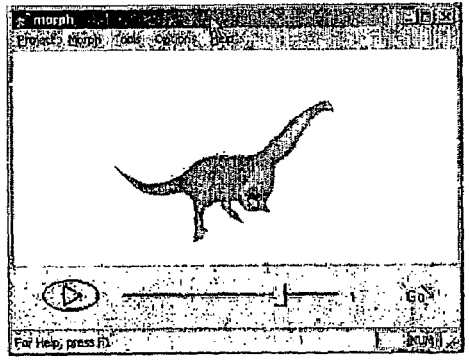

FIG. 3 illustrates flexible user control in the invention using the example of morphing from a duck to a dinosaur. First as shown in FIG. 3(a), the user can specify correspondences for components and modify his specifications; the system maintains these specifications using a constraint tree. FIG. 3(b) shows that the user only pairs components of interest; the system deduces the complete component correspondence. The user can choose to specify local feature pairs (but none for this example); the system deduces implied and assumed local features, as highlighted in FIG. 3(c). Based on all local feature pairs, the system computes the complete vertex correspondence for two meshes through automatic patch partitioning, which creates compatible patch layouts as shown in FIG. 3(d). Then, interpolation between each pair of vertices is performed and the morphing sequence is produced. FIG. 3(e) shows an object at an intermediate frame. The user specifies the trajectory of a component (the head) as a whole; the system then deduces vertex trajectories accordingly and produces a new morph. An object at the same frame as in FIG. 3(e) is shown in FIG. 3(f). In this figure, corresponding components/patches are shown with the same shades.

Components

A mesh exists as a collection of polygons and contains no explicitly defined high-level information. To manipulate a mesh at a high level, the example embodiment decompose it into a collection of primitives, each of which comprises a group of polygons. Such a primitive is termed a component. A component does not necessarily have to be semantically meaningful. When a user wants to manipulate some polygons as a whole, he can group these polygons as a component. Users can decompose each original mesh according to their morphing requirements. The system provides some interactive toolkits (such as cutting-plane, and polygon-selection tools) for interactive component decomposition. Some automatic methods can also be used to compute initial decomposition, which can be modified subsequently by users.

Figure 4:
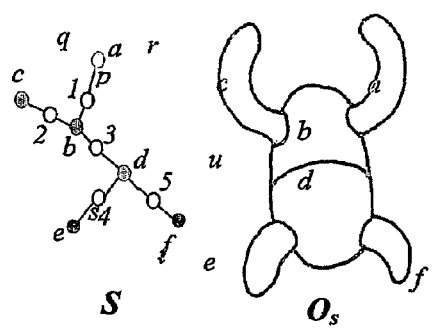
FIG. 4 is an example source object $O_s$, the target object $O_t$, and their respective connectivity graphs S and T.
Figure 4:
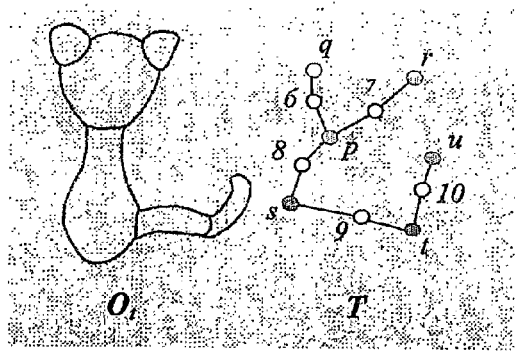

Two connected components share some edges and vertices, which we call a boundary. A component can have a number of boundaries, each of which represents a connection with a neighboring component (or in short, a neighbor). For a mesh, we represent its components and the connections between the components as a connectivity graph. In this graph, each component is represented as a node, and each connection between two components as an edge connecting the two nodes of the components. FIG. 4 illustrates the above definitions using a source object $O_s$, a target object $O_t$ and their respective connectivity graphs S and T. In this figure and subsequent figures, the connections of connectivity graphs are shown explicitly as white nodes for ease of illustration.

Overall Process of an Example Embodiment

Figure 5:
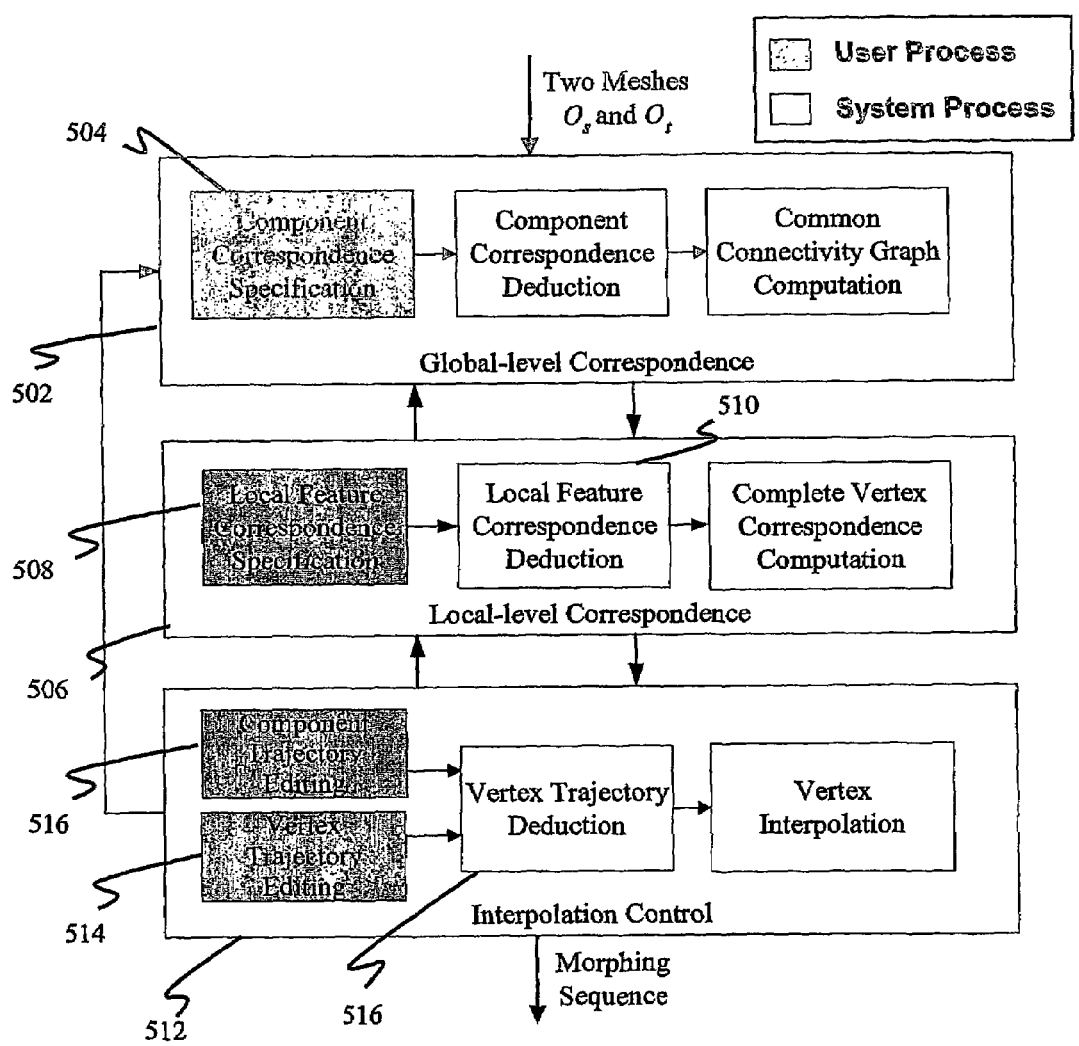
FIG. 5 shows main steps in a typical workflow of the example embodiment.

FIG. 5 shows the main steps in a typical workflow of our invention. The invention allows flexible user control—at any step, a user can re-visit any previous step to modify his specifications. In addition, he only needs to specify those requirements of interest, and the system can complete the remaining work through deductions.

In the process of establishing global-level correspondences (502), the user can freely decompose each mesh into components and pair components of one mesh with those of the other (504). The component decompositions of the original meshes need not be compatible in the sense of having the same number of components and the same connectivity among the components. The use of a proposed constraint tree assists user interaction and supports modification to users specifications.

In the process of establishing local-level correspondences (506), the user can specify and pair several kinds of local features (508). The system deduces implied local features according to user specifications (510) and adds assumed ones where appropriate.

In the process of interpolation control (512), the user is allowed not only to modify trajectories of individual vertices (514) at the local level, but also to manipulate trajectories of components (516) as a whole at the global level. The system can deduce vertex trajectories from component trajectories (518).

Global-Level Correspondence

Figure 6:
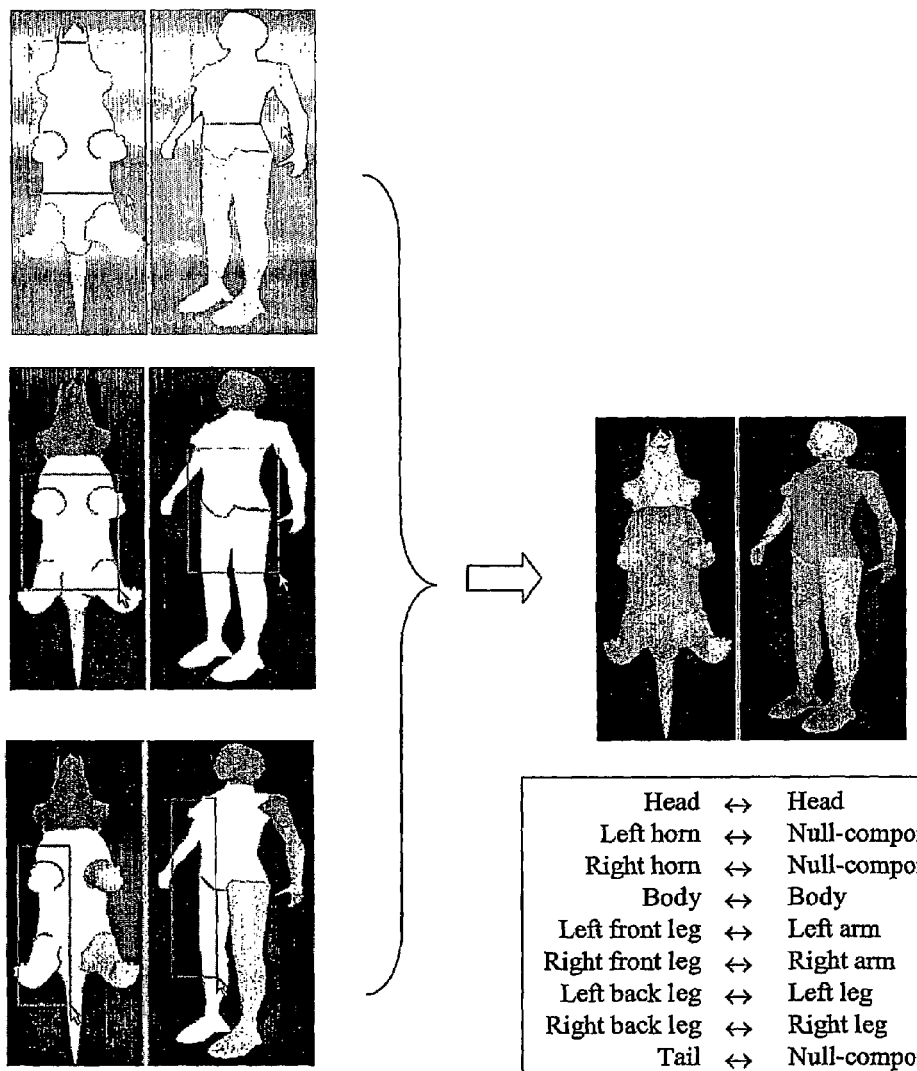
FIG. 6 is shows user-specified component correspondences for the example of triceratops-woman morph.

Given $O_s$ and $O_t$, users can specify correspondences over their components in the global-level correspondence process. The result of this process is to establish the complete component correspondence for $O_s$ and $O_t$. To facilitate user control, the following issues are addressed:

First, a user should be allowed to specify correspondence between groups of components, rather than only between one component from $O_s$ and one from $O_t$. An example in FIG. 6 illustrates the efficiency of correspondences over component groups. For the triceratops-woman morphing, three user-specified component correspondences are as shown in the left three pictures. The first one is to pair the front part of the triceratops with the upper part of the woman; the second pairs their middles; the third pairs their left halves. After these specifications, the system is able to calculate the complete component correspondence, in which their heads, bodies and limbs are corresponding while the tail and horns of the triceratops are mapped to null-components, as shown in the right picture. In addition, users can start with vague requirements using correspondences between groups of components and then iteratively refine their requirements while they are experimenting with morphing design. However, this causes difficulties in encapsulating and maintaining user-specified correspondences due to the inherent ambiguity of such specifications. To overcome these, the example embodiment implicitly records all possible component pairs and to keep track of the evolution of user specifications. The example embodiment further organizes all recorded correspondences to keep the history of user specifications. This method provides great flexibility to users, from undoing correspondence specifications to modifying component decompositions, without the need of restarting this process.

Next, when a user selects a group of components, he should be assisted in locating the probable counterparts of this group. Such counterparts are those components which have similar in connectivity to the components in the selected group. We note that the method of analyzing the connectivity at individual components is may not be feasible when correspondences between groups of components are supported.

Finally, a user should be allowed to specify only the correspondences of interest, and then the complete component correspondence should be automatically deduced by the system with all user-specified correspondences respected. In achieving this, our invention provides a range of automations: from totally manual (the user specifies detailed correspondences for every component) to semi-automated (the user specifies only important correspondences and the system computes the others) to fully-automated (the system computes all correspondences without any user input).

Terminology

The source connectivity graph S and the target connectivity graph T are represented as the two graphs $G(V_S, E_S)$ and $G(V_T, E_T)$ respectively, where $V_S$ and $V_T$ are sets of components and $E_S$ and $E_T$ are sets of connections. An example of S and T is shown in FIG. 4, where $V_S=\{a,b,c,d,e,f\}$, $E_S=\{1,2,3,4,5\}$ and $V_T=\{p,q,r,s,t,u\}$, $E_T=\{6,7,8,9,10\}$. Note that when a user modifies the decomposition, for example, by merging two connected components, the connectivity graph is changed and updated accordingly.

Given S and T, a user can specify a global-level correspondence by associating a group of components of $O_s$ with a group of components of $O_t$. Such a user-specified correspondence is termed a constraint. The final product of this correspondence process is a common connectivity graph M. It is defined as a graph whose nodes, called correspondence nodes, and edges, called correspondence edges, represent pairs of corresponding components (i.e. component pairs) and pairs of corresponding connections (i.e. connection pairs) respectively. In the case where a component of one object has no counterpart in the other object, we designate a null-component, denoted as $\zeta_v$, as its counterpart. The notation $\zeta_E$, termed the null-connection, is similarly used when a connection has no counterpart.

Figure 7:
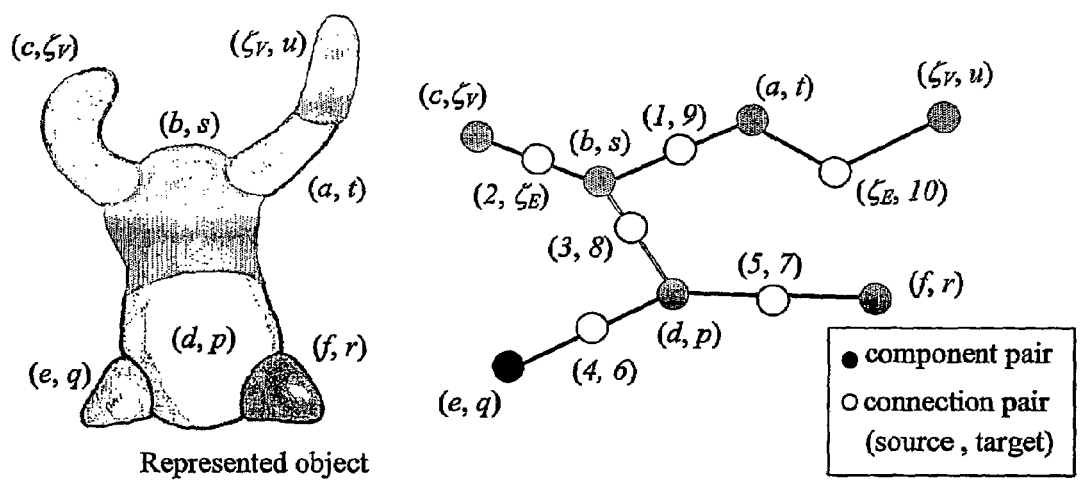
FIG. 7 is an example of the common connectivity graph M.

Specifically, $M = G(V_M, E_M)$ where $V_M$ is the set of correspondence nodes and $E_M$ is the set of correspondence edges. A correspondence node has one of these forms: $(v_s, v_t)$, $(v_s, \zeta_v)$ or $(\zeta_v, v_t)$ where $v_s \in V_S$, $v_t \in V_T$, and every $v_s$ or $v_t$ appears in exactly one correspondence node of M. Similarly, a correspondence edge has one of these forms: $(e_s, e_t)$, $(e_s, \zeta_E)$ or $(\zeta_E, e_t)$ where $e_s \in E_S$, $e_t \in E_T$ and every $e_s$ or $e_t$ appears in exactly one correspondence edge of M. For the two connectivity graphs in FIG. 4, a possible M constructed is as shown in FIG. 7. Note that the component c of the source, which is paired with a null component $\zeta_v$, will gradually shrink during the morphing. Conversely, the component u of the target will gradually grow.

Correspondence Between Component Groups

To effectively capture all constraints without imposing any system-caused restriction, we need to keep track of all possible correspondences over components and all possible correspondences over connections. Unfortunately, naïvely recording all these possibilities is generally inefficient in terms of storage and computation. Instead, we record and update them in an implicit and concise way as described below.

Permissibility and Completeness

A permissible component pair is defined as a component pair that can possibly appear in the final M. The set of all permissible component pairs is denoted as $R_v$. Note that $\{(v_s, \zeta_v) | v_s \in V_S\}$ and $\{(\zeta_v, v_t) | v_t \in V_T\}$ are always subsets of $R_v$, as it is always possible that a component in an object has no counterpart in the other object. In addition, a correspondence between two groups of components is denoted as (X, Y) where $X \subseteq V_S$ and $Y \subseteq V_T$. Specifically, (X, Y) means that (x, $\bar{y}$) and ($\bar{x}$,y) are not permissible component pairs for all $x \in X$, $y \in Y$, $\bar{x} \in V_S - X$ and $\bar{y} \in V_T - Y$. We say (X, Y) is complete if, and only if, $\forall x \forall y, (x, y) \in R_v$.

The permissibility and completeness of a correspondence over connections can be defined in a similar way. The set of all permissible connection pairs is denoted as $R_E$.

A combined notation for correspondences over both components and connections has the form (P, Q), in which $P = G(X, E)$, where $X \subseteq V_S$, $E \subseteq E_S$, and $Q = G(Y, F)$, where $Y \subseteq V_T$, $F \subseteq E_T$. Note that in P, X may not contain all the nodes that the edges in E are incident to. Therefore, P may not be a usual graph and likewise for Q. They are denoted as graphs here for the convenience of description. The definition of completeness of correspondences is extended to this notation: (P, Q) is complete if, and only if, (X, Y) is complete and (E, F) is complete.

Throughout the process of specifying global-level correspondences, all current correspondences of S and T are encapsulated in a current correspondence set, defined as $$\square = \{(P_i, Q_i) | i = 1, 2, \ldots, n\}$$

where $(P_i, Q_i)$ is complete and $P_1, P_2, \ldots, P_n$ is a partition of S and $Q_1, Q_2, \ldots, Q_n$ is a partition of T. Let $P_i = G(X_i, E_i)$ and $Q_i = G(Y_i, F_i)$, we have $R_V$ and $R_E$ implicitly recorded as:

$$R_V = \bigcup_i \{(X_i \cup \{\zeta_V\}) \times (Y_i \cup \{\zeta_V\})\} - \{(\zeta_V, \zeta_V)\}$$

$$R_E = \bigcup_i \{(E_i \cup \{\zeta_E\}) \times (F_i \cup \{\zeta_E\})\} - \{(\zeta_E, \zeta_E)\}$$

In other words, a component pair $(v_s, v_t)$ is permissible if $v_s$ and $v_t$ are found within a $(P_i, Q_i) \in \square$ for some i. Similarly a connection pair $(e_s, e_t)$ is permissible if $e_s$ and $e_t$ are found within a $(P_j, Q_j) \in \square$ for some j.

Processing Constraints

When a user is specifying a constraint, it is more intuitive for him to pair components than to pair connections. Therefore, in the current preferred embodiment, a constraint is a correspondence over components (X, Y), where $X \subseteq V_S$, $Y \subseteq V_T$. From such a constraint, the system induces another correspondence between all connections incident to components in X, denoted as the set E, and all connections incident to components in Y, denoted as the set F. Both correspondences are jointly represented as (P, Q) where $P = G(X, E)$ and $Q = G(Y, F)$.

Figure 8:
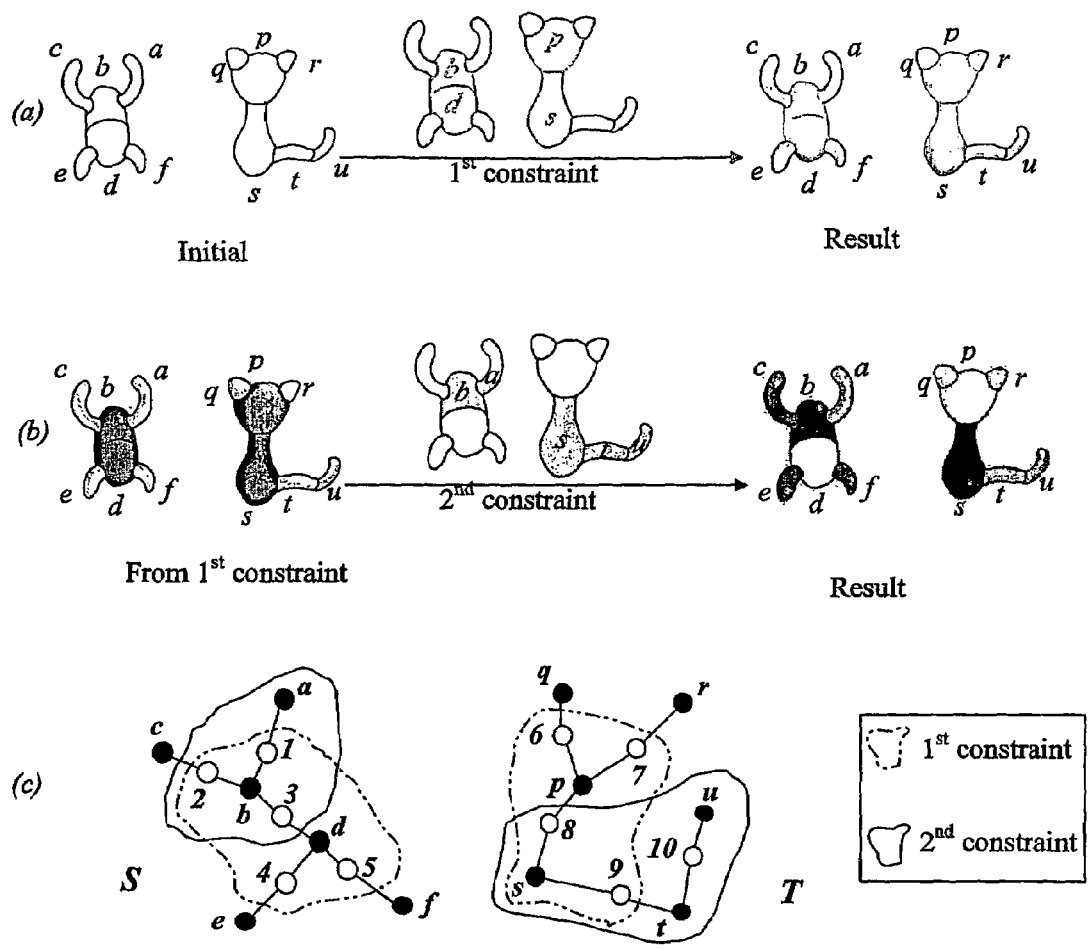
FIG. 8 is an example that shows the maintenance of □ after applying two constraints to S and T in FIG. 4.

Initially, we have $\square = \{(S, T)\}$ where every component (connection, respectively) of S can be possibly paired with every component (connection, respectively) of T. Given a (P, Q), we partition each $(P_i, Q_i) \in \square$ into $(P_i', Q_i')$ and $(P_i'', Q_i'')$, where $P_i' = P \cap P_i$, $Q_i' = Q \cap Q_i$, $P_i'' = P_i - P_i'$ and $Q_i'' = Q_i - Q_i'$. If either $(P_i', Q_i')$ or $(P_i'', Q_i'')$ is the trivial case of $(G(\phi,\phi), G(\phi,\phi))$, it can be removed from $\square$. It can be shown that the new $\square$ still retains the properties of completeness. Thus, $R_v$ and $R_E$ implicitly recorded in the new $\square$ still contain all the permissible component pairs and all the permissible connection pairs and they respect all user-specified requirements inclusive of the latest one (P, Q). For S and T in FIG. 4, FIG. 8 shows maintenance of $\square$ upon two constraints. In FIG. 8(a) and FIG. 8(b), the component correspondences after each constraint are shown in the rightmost pictures. In FIG. 8(c), the first constraint ({b,d},{p,s}), which induces the connection correspondence ({1,2,3,4,5},{6,7,8,9}), is circled by dashed lines while the second constraint ({a,b},{s,t,u}), which induces the connection correspondence ({1,2,3},{8,9,10}), is circled by solid lines. The content of $\square$ in this example is shown in leaves of the tree in FIG. 9.

Constraint Tree

To further facilitate user specifications, we record the history of constraints. We use a binary tree, termed constraint tree, where each $(P_i, Q_i)$ in $\square$ is represented as a leaf. Whenever we perform a partitioning of $(P_i, Q_i)$ upon the specification of a new constraint, we create a left child and a right child for this leaf, which correspond to the new correspondences $(P_i', Q_i')$ and $(P_i'', Q_i'')$ respectively. Obviously the current correspondence set $\square$ is actually the set containing all the leaves of the constraint tree. The content of a parent node is always equal to the union of the contents of its children; thus, it is not necessary to explicitly record the content of all internal nodes in the constraint tree.

Figure 9:
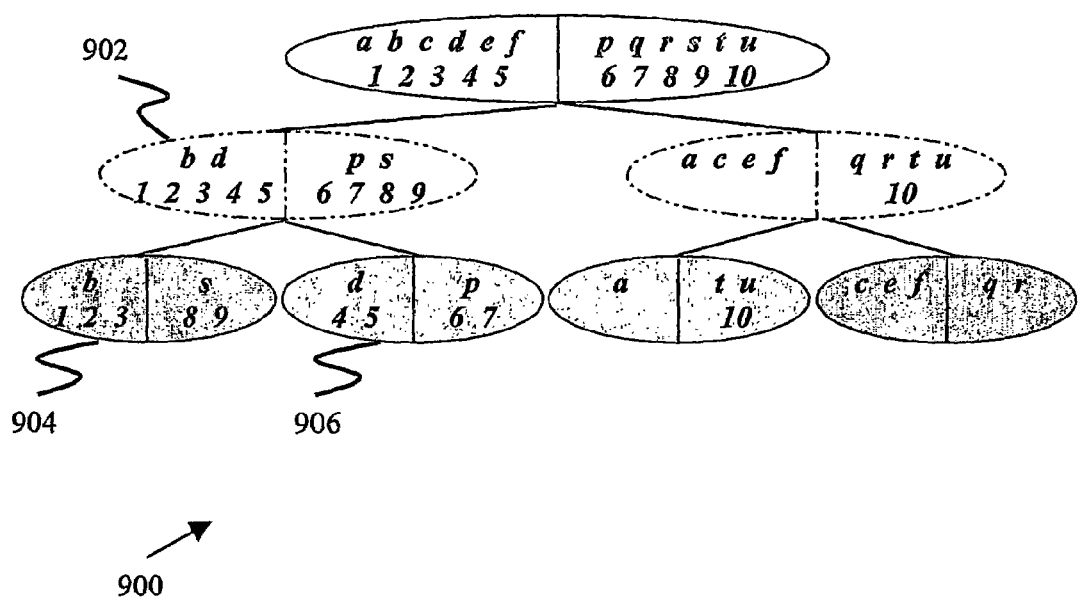
FIG. 9 is a constraint tree constructed for the example in FIG. 8.

For the example in FIG. 8, the constraint tree (900) is shown in FIG. 9. Note that the $i^{th}$ constraint is encapsulated in those nodes at the $i^{th}$ level of the constraint tree. In this figure, the contents of the internal nodes (e.g. 902) of the constraint tree are labeled only for clarity as they can be inferred recursively from the contents of their children (e.g. 904, 906). Such a tree structure makes it easy to undo any constraint specification while other constraints are unaffected, as stated next.

Flexible Undoing

Upon a user requirement of undoing a specific $i^{th}$ constraint, a naïve approach is to remove constraints in reverse order from the most recent one to the $i^{th}$ constraint. As a result, the user will lose all those constraints that are specified after the $i^{th}$ constraint. Using the constraint tree, this examples embodiment is able to remove solely the influences of the specific $i^{th}$ constraint. For each pair of nodes $n_l$ and $n_r$ at level i, let $n_p$ be their parent. We merge the two respective left (right, respectively) subtrees of $n_l$ and $n_r$ to be the new left (right, respectively) subtree of $n_p$. Merging of subtrees is done by using the following procedure: we superimpose them and combine the contents of the superimposed nodes to obtain a new subtree having the same structure. This operation effectively removes the nodes at the level representing the unwanted constraint from the constraint tree.

Modifying Component Decomposition

A user is allowed to modify the component decompositions of $O_s$ and $O_t$ in the process of specifying correspondences. In such a case, we need to update S, T and the constraint tree while preserving all unaffected constraints. Such a modification can always be expressed as one of the two kinds of operations: splitting a component into two, and merging two connected components into one.

Splitting can be easily handled. We only need to find the leaf that contains the component to be split, replace it with two new components and update connections accordingly. The structure of the constraint tree is not affected.

Merging is more complicated if the components to be merged are not within the same leaf. In such a circumstance, the structure of the constraint tree has to be updated. First, we locate the leaves containing the two components to be merged. Next, we search upward from the leaf level to find their nearest common ancestor. The constraint that is represented by the level below this common ancestor is then the one that separates the two components. Then, this constraint is removed via the flexible undoing discussed in the previous subsection. These three steps are repeated until all the constraints that cause the separation of the two components are removed. Finally, the components to be merged are replaced with the new component and the connections are updated accordingly.

Identifying Candidates

The constraint tree keeps track of all the permissible component pairs implicitly. Therefore, for a leaf $(P_i, Q_i)$, all the components in $P_i$ are naturally possible counterparts for any component in $Q_i$, and vice versa. In a morph, however, a user generally expects the connectivity among components be kept as much as possible. For example, if the head and the body of a cow have been paired with the head and the body of a triceratops respectively, the user may not regard the horns of the triceratops as good counterparts for a leg of the cow although they are in the same leaf. Therefore, the user usually expects a good counterpart to be similar in connectivity to the selected components. We call a counterpart that can meet such kind of user expectation a candidate. To identify candidates from the set of possible counterparts, we need to analyze the connectivity among components as follows.

Figure 10:
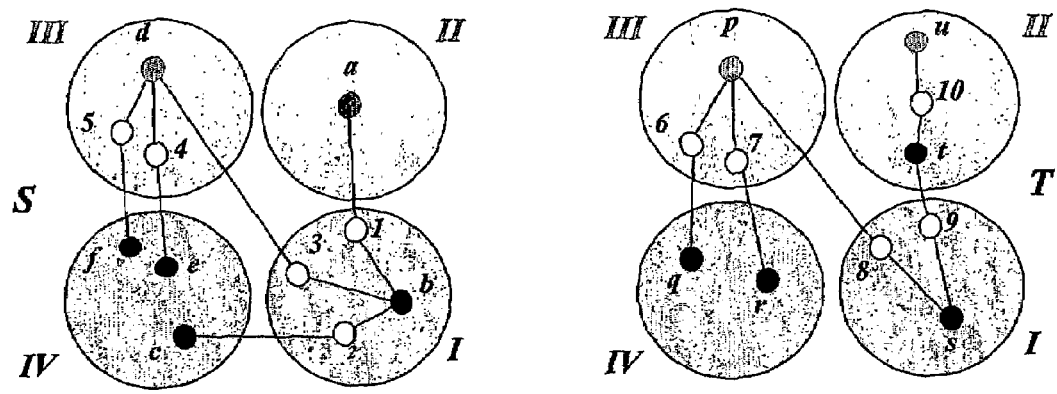
FIG. 10 is the analysis of similarity in connectivity for the example in FIG. 9.

Within a leaf, the components are placed into groups of maximally connected components. FIG. 10 illustrates analysis of similarity in connectivity for the example in FIG. 9. For clarity, the contents of S and T are shown separately and shaded the same as the leaves shown in FIG. 9. See FIG. 10, there is a single group of T in the leaf II which contains t and u connected by 10. Similarly, leaf IV contains two groups of T, which contains q and r respectively.

For such a group within a leaf, we define a neighboring leaf of this group to be a different leaf that contains a connection incident to any component within the group, or one that contains a component incident to any connection within the group. Consequently, we define the similarity in connectivity as follows: a group in S is similar in connectivity to a group in T if they are from the same leaf of the constraint tree and have the same set of neighboring leaves. See FIG. 10. In leaf IV, the group containing e in S is similar in connectivity to both the group containing q and the group containing r in T as they have the same set of neighboring leaves, {III}. On the other hand, the group containing c in S has no similar counterpart in T.

The above definition can also be extended to provide a range of intermediate degrees of similarity in connectivity by considering how much the two sets of neighboring leaves overlap instead of simply using an equality check.

Constructing the Common Connetivity Graph

The constraint tree effectively encapsulates all constraints and its leaves contain all permissible component/connection pairs. Thus, once the user finishes all his specifications about component correspondence, the system constructs M as follows. First, we refine the constraint tree until each leaf contains at most one component or connection of S and at most one component or connection of T. Then we construct correspondence nodes and correspondence edges of M from all non-empty leaves.

Figure 11:
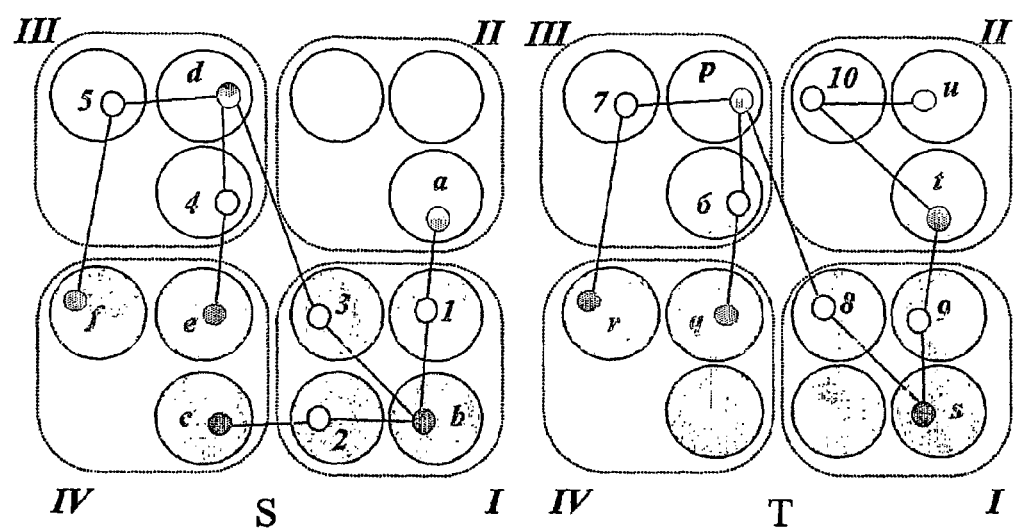
FIG. 11 illustrates the stages of refining the constraint tree in computing M.

In one embodiment, the refinement step consists of two stages. The first is to pair up maximally connected groups of components within each leaf and refine the constraint tree by treating these new pairs as constraints. This is done iteratively until each leaf in the constraint tree has at most one connected component group from S and at most one from T. When component groups are paired up, preference is given to those groups that are similar in connectivity. Using the example in FIG. 10, we illustrate this stage in FIG. 11. Leaf IV contains three groups of maximally connected components in S. In particular, the components groups {e} and {f} can be arbitrarily paired with the component groups {q} and {r} as they both have leaf III as their only neighboring leaf. The content of the rest of the leaves are unchanged because each leaf has only one connected group inside.

The second stage of the refinement step is to pair up individual components within each leaf and refine the constraint tree accordingly. Similarity in connectivity is still employed, but applied to the neighbors of a component or connection, as opposed to neighbors of the connected component group in the first stage. Firstly, preference is given to those components or connections that are similar in connectivity. Secondly, additional preference is given to those components or connections that are directly connected to some components or connections in other leaves. This is done iteratively until each leaf has at most one component or one connection from S and at most one component or connection of T. After further refinement in the second stage, in leaf II in FIG. 11, there are one component of S and two of T. a is finally paired with t because they are more similar in connectivity and both are directly connected to leaf I. Subsequently, both 10 and u of T have no counterparts in S.

When the refinement step is done, the system then calculates the common connectivity graph M from the current correspondence set □ as follows. First, construct a correspondence node for the component pair in every $(P_i, Q_i)$. $\zeta_v$ is paired with every component that has no counterpart. Then, construct a correspondence edge for the connection pair in every $(P_i, Q_i)$ in a similar fashion. $\zeta_E$ is paired with every connection that has no counterpart. Wherever any connection from a correspondence edge is incident to any component from a correspondence node, we set this correspondence edge to be incident to this correspondence node. For the example in FIG. 11, a possible M computed is as shown in FIG. 7.

Local-Level Correspondence

For each component pair containing no null-component, the user can specify and pair local features to control the morph (see section on USER-SPECIFIED LOCAL-LEVEL CORRESPONDENCE). In addition to user-specified local-level correspondences, the invention deduces implied local-level correspondences according to user specifications (see section on IMPLIED LOCAL-LEVEL CORRESPONDENCE) and adds assumed ones where appropriate to improve the morphing (see section on ASSUMED LOCAL-LEVEL CORRESPONDENCE). An automatic patch-partitioning method (see section on AUTOMATIC PATCH PARTITIONING) is proposed here to create compatible patch layouts subsequently. These patches are then used to establish the complete vertex correspondence for the component pair. For any component pair containing a null-component, the invention can automatically construct its complete vertex correspondence (see section on HANDLING NULL-COMPONENTS).

User-Specified Local-Level Correspondence

In the example embodiment, a user can specify several types of local features within a component: a feature vertex is a mesh vertex of a component, a feature line is a sequence of connected mesh edges and a feature loop is a closed loop of mesh edges. Then, the user can pair a local feature in one component with one in its corresponding component; the two local features then form a local feature pair. The two end-vertices that a user uses to define a feature line are also treated as feature vertices. Note that after obtaining a morph, a user can revisit this step to add or modify local feature pairs in order to improve the morph.

Implied Local-Level Correspondence

Recall that a boundary between two connected components is shared by both of them. Thus, from those user-specified global-level and local-level correspondences involving boundaries, the invention is able to deduce implied local-level correspondences to save user effort.

First, correspondences over component boundaries can be derived from the common connectivity graph M. Recall that a correspondence edge in M represents a connection pair and each boundary of a component represents a connection. Thus, from M, we can deduce a set of corresponding boundaries (each boundary is then a feature loop). For the example of M in FIG. 7, the boundary of component d connecting component f and the boundary of component p connecting component r form an implied local feature pair as deduced from the correspondence edge (5,7). At the same time, this correspondence edge implies another local feature pair at boundaries in the component pair f and r.

Second, within a pair of components, if two corresponding local features are both specified at boundaries and the two neighbors at these two boundaries are also corresponding, the system duplicates these two local features in the neighbors to form another local feature pair.

Assumed Local-Level Correspondence

A user can choose to only specify those local feature pairs of interest. The invention is then able to add implied local feature pairs when the user has finished his specification so far. In the event that he subsequently specifies new feature pairs after the assumed features are added, the existing assumed features are removed and new ones are calculated where appropriate.

In the following, we define distance between two vertices as the length of the shortest path between them along the mesh edges, and distance between two local features as the minimum distance between their vertices.

First, consider two corresponding components each have only one boundary. To better align the two components, the invention adds one more feature vertex pair at their tips. In one embodiment the tip vertex of such a component is defined as follows. Among all the vertices of the component, the vertex farthest away from its boundary is first located and then treated as its tip vertex. For example, their tails of a cow and a triceratops each have only one boundary, and the system adds a pair of feature vertex at their tips as highlighted in FIG. 12(*b*), Such assumed correspondence between tip vertices can be helpful to avoid the "tip-shrinkage" problem mentioned in [GSL98]. In addition, each component has at least two local features after all assumed tip vertex pairs are computed.

Second, for two corresponding feature loops $l_s$ and $l_t$ of a component pair $(c_s, c_t)$, there should be at least two feature vertex pairs on them so that the system knows how they are aligned during morphing. When the user does not provide this, the system will add assumed feature vertex pairs on $l_s$ and $l_t$ as follows.

The general idea to decide the alignment is to examine $l_s$ and $l_t$, together with local features nearby, to obtain a relative orientation. This is an attempt to avoid unnatural twisting during a morph. For $l_s$, we locate its nearest local feature $l_s'$ on $c_s$. Let $v_s$ be the vertex of $l_s$ on the shortest path from $l_s$ to $l_s'$. Let $l_t'$ be the corresponding local feature of $l_s'$ on $c_t$, and let $v_t$ be the vertex of $l_t$ on the shortest path from $l_t$ to $l_t'$. We have $(v_s, v_t)$ as one assumed feature vertex pair, and obtain another assumed feature vertex pair formed by the two vertices on the boundaries farthest away from (or opposite to) $v_s$ and $v_t$ respectively. Note that the treatment for $l_s$ and $l_t$ is asymmetric in this approach. See the example in FIG. 12(*a*). With correspondences at boundaries for the body of a cow and that of a triceratops, the system adds two pairs of feature vertices, as highlighted in the figure, for every two corresponding boundaries.

Figure 12:
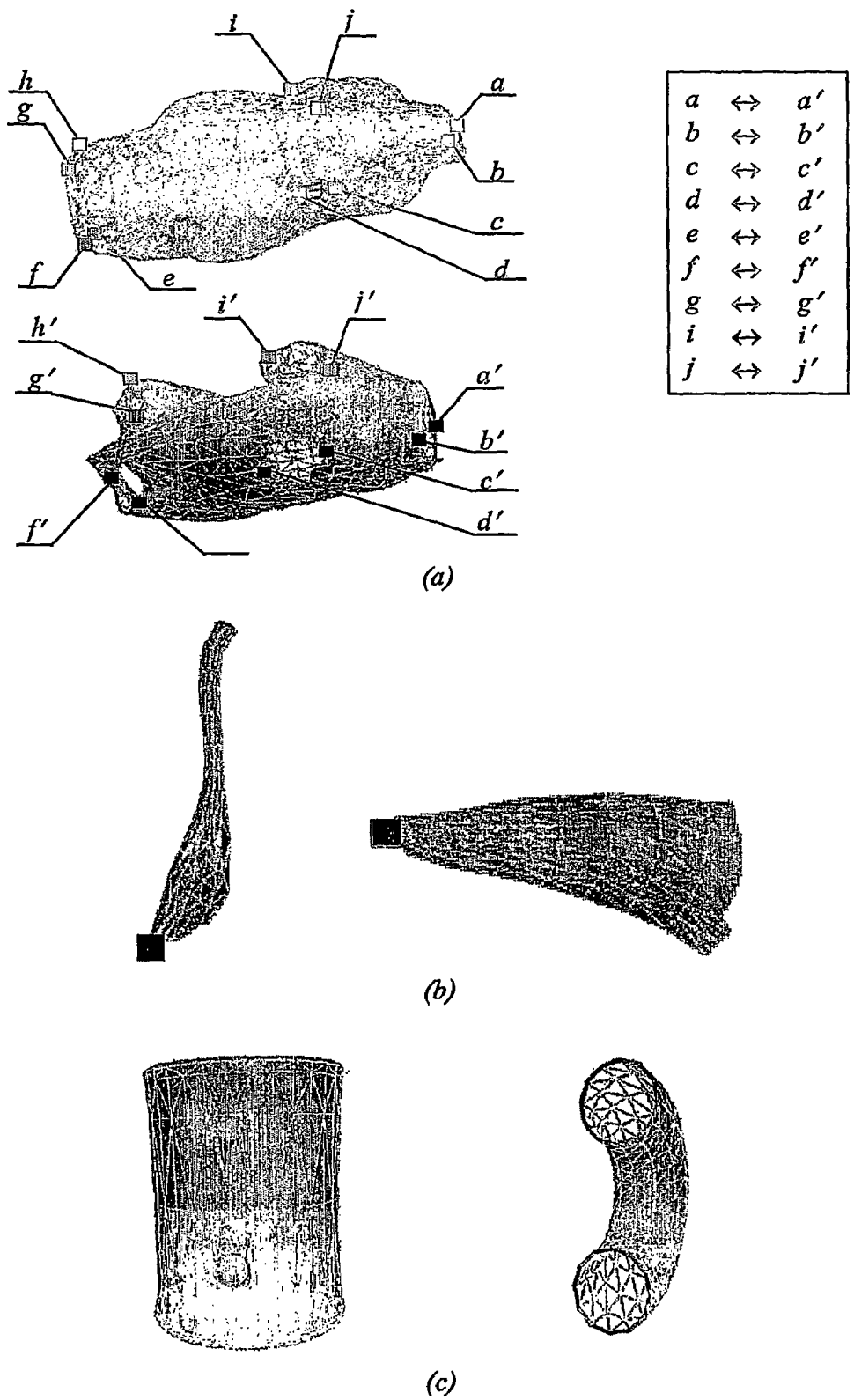
FIG. 12 illustrates those assumed local-level correspondences.

Third, if there is more than one connection between two components in a mesh and the same between their corresponding components in the other mesh, the correspondences between their boundaries are not uniquely defined and are assigned in the computation of M. When the user specifies correspondences between some boundaries, the invention assumes the correspondences for the remaining boundaries by re-computing M. FIG. 12(*c*) illustrates this in the morphing from a mug to a donut. The user pairs a boundary of the mug's body with a boundary of the donut's half; the system then pairs the remaining boundaries.

Automatic Patch Partitioning

Given local feature pairs in two corresponding components, there are various ways to establish the complete vertex correspondence with all their local feature pairs aligned. The common approach is to first partition the meshes into pairs of compatible patches and then perform a mapping and merging process for each pair of patches [DG96, GSL98, KSK00].

In the example embodiment, we automatically establish compatible patch layouts for two corresponding components. Users can choose to modify established patch layouts when necessary. Firstly, we group all local features in each component into a set of feature groups, each of which is a maximally connected group of local features. Secondly, a spanning tree is constructed to link up all the feature groups in one component. Thirdly, another spanning tree is constructed to connect all the features that are in the leaf nodes of the first spanning tree. A link between two feature groups is defined as a path over mesh edges of mesh surfaces that starts at a feature vertex in one feature group and ends at a feature vertex in another feature group. Then, the component being processed is partitioned into patches according to links in these two spanning trees. Finally, we treat the net formed by the two spanning trees as a coarse model to guide the partitioning of the other component into a compatible patch layout.

During the construction of two spanning trees, there are two problems to be considered. First, as we observed, smoother patch boundaries usually result in better morph results. However, a link formed by the shortest path between the two feature vertices often cannot fulfill such a need. Second, to speed up the computation of links, we make use of existing mesh edges to form links. However, sometimes a link between two given feature vertices may not exist in cases that the original mesh is not tessellated enough. In one embodiment, the above two problems are addressed as follows.

During the construction of spanning trees, Dijkstra's Algorithm [AHU83] is first chosen because it is fast and can be implemented easily. During the implementation of this algorithm, we add a restriction on path computation and modify the cost function used to evaluate the weight of each edge during a relaxation procedure. For each vertex $v_0$, it has several incident vertices and the same number of incident edges. When trying to relax an incident edge e, we defined a new cost function for e as below, instead of simply using its length:

$$Cost(e) = l \times (a \div \pi)$$

where a is the dihedral angle smaller than $\pi$ (therefore, $a/\pi$ is always smaller than one), l represents the length of the edge e.

In practice, consecutive protuberant edges on a surface are often observed as salient features on the surface. For a link passing through this area, a user would like to see it go along these protuberant edges in order to avoid serious twisting effects in the final morph. With the new cost function, such kind of edges is more likely to be chosen. This is because the dihedral angle between the two adjacent triangles of such edges is much smaller than $\pi$.

Furthermore, we need to break triangles of an original mesh when the mesh is not tessellated enough. One possible embodiment is to break triangles where necessary at the same time of computing paths, such as in [KSK00]. However, when triangles are broken on the fly, a lot of tiny or sharp triangles may be produced and thus cause many potential numeric errors in later computation of parameterizing patches. To avoid such problems, we try to preserve the initial mesh triangulation as much as possible. Therefore, we apply the following precautionary method in one embodiment. Whenever we find a new link in a component, we check all the vertices along the link and their surrounding area to find triangles that have to be broken, and then break the found triangles in advance. This process is iteratively applied till all links of the constructed two spanning trees are computed.

Both the deduction of local feature pairs and the automatic patch partitioning are efficient. This is because analyzing component boundaries, component connectivity and distances between vertices of local features (over mesh edges) does not involve expensive computations. With compatible patch layouts for each pair of components, there are several methods for topological merging that can be used to create the complete vertex correspondence for each pair of patches, for example, barycentric and harmonic mapping [KSK00, ZSH00]. However, establishing the meta-mesh by overlapping the mapping of two meshes is known to be costly in computation. By working on components instead of the whole meshes, such computation in our invention is speeded up. On the other hand, the invention can also use other efficient methods such as multi-resolution re-meshing in the place of topological merging in one embodiment.

Handling Null-Components

For a component pair $(c_s, c_t)$ where $c_s \in O_s$ and $c_t = \zeta_v$ (or $c_s = \zeta_v$ and $c_t \in O_t$, respectively), there will be a component disappearing (or growing, respectively) in the morphing sequence. Without loss of generality, we only discuss the case of component disappearing ($c_t = \zeta_v$). Let $c_s'$ be a component connected to $c_s$ at boundary $l_s$ in $O_s$ and $(c_s', c_t')$ be a component pair. The invention handles this in different ways according to user input.

In the first case, when the user specifies local-level correspondence for the component pair $(c_s', c_t')$, he can assign a local feature $l_t$ in $c_t'$ to be the counterpart of $l_s$. Then, the system is responsible to produce a morph where $c_s$ will gradually disappear into $l_t$. The following method is applied to automatically construct a new component c at $l_t$ to be the counterpart of $c_s$. First, it creates the topology (i.e. the mesh connectivity) of c by copying the topology of $c_s$. Note that vertices of both components naturally form vertex pairs, each of which comprise two corresponding vertices in $c_s$ and c. Next, for each vertex pair $(v_s, v_t)$, if $v_s$ is at $l_s$, $v_t$ is already a vertex of $l_t$; otherwise, $v_t$ is set at the position of v where $(u, v)$ is a vertex pair and u is the boundary vertex closest to $v_s$. By replacing $c_t$ with c, the system then establishes complete vertex correspondence for this component pair.

In the second case, when the user has not assigned correspondence for the boundary $l_s$ when he continued into the process of patch partitioning, the system simply merges $c_s$ into $c_s'$ so that the counterpart of $l_s$ is determined by the topological merging. Note that when $c_t' = \zeta_v$, the merging of $c_s$ into $c_s'$ is also applied.

Interpolation Control

From the complete vertex correspondence for every component pair, the example embodiment performs interpolation between each vertex in one mesh and its corresponding vertex in the other. Various vertex interpolation methods can be applied in this step, for example, linear interpolation or as-rigid-as-possible interpolation [ACL00]. In this invention, the use of components enables users to edit the trajectories of a component as a whole at the global level. Such kind of editing is usually much easier and more intuitive than editing trajectories of individual vertices. Once the trajectory of a component is known, the trajectories of its vertices can be deduced accordingly.

In one embodiment, the user can assign for each component a bone, which is a polyline. The bones of all components in a mesh form its skeleton. Interpolation between the source and target meshes can thus be abstracted into interpolation between their skeletons. In our invention, the bone of a component is used as a simple yet effective tool for users' manipulation of the component. Note that the user can assign a bone according to his requirements in the interpolation and it is not required that the bone must accurately represent the component's shape. Besides some interactive toolkits in our GUI, there are various automatic methods [VL99, LWT01] that can be adapted in our invention to produce skeletons.

To bind mesh vertices to underlying bones in a morph, there are many possible implementations. One is to adapt the weighted vertex method to blend the associations between mesh vertices and line segments of underlying bones. For each mesh vertex, we find the point on its underlying bone that is nearest to the vertex, and compute its arc-length values along the bone. By interpolating arc-length values and relative positions of mesh vertices with respect to their nearest points on the bones, each mesh vertex in the source mesh can be transformed to its corresponding vertex in the target according to the complete vertex correspondence.

There are several challenges when skeletons are utilized in morphing. The most obvious one is that the skeletons of two original meshes are usually very different in structure. Moreover, it usually happens that some components in one mesh have no counterparts in the other. Due to the one-to-one relationship between a component and its bone, the common skeleton of the source and the target skeletons can be directly constructed from the common correspondence graph M. Thus, each bone in one skeleton is paired with a bone in the other skeleton, or a null-bone (from a null-component in M). Consequently, the morphing of skeletons can be computed by interpolating between every two corresponding bones.

Due to the low computational cost of skeletons, morphing of skeletons can serve users as a fast means to get a general idea of how the final morph will look like. Therefore, the user can decide whether to modify his global-level specifications before the computation of final morphs, which is much more costly.

Figure 13:
FIG. 13 is an example of component keyframe editing.

As for user control in the interpolation step, the user can specify the position or orientation of a component by editing the bone of the component. Accordingly, the system is able to deduce the trajectories of its vertices based on their relative positions with respect to that bone. See the example in FIG. 13. In this morph, a calf is transformed into a cow, then into a triceratops during its walking. This is conveniently achieved by adding four component keyframes.

Our system also allows a user to specify the trajectory of individual vertices. Given a user-specified vertex position at an intermediate frame, the system computes the arc-length value and the relative positions of the vertex and then interpolates its arc-length value and relative positions during the morph. Being able to control the interpolation step at both the global and the local levels, the user can then achieve sophisticated morphing trajectories efficiently.

Operation of the Method of the Example Embodiment

Figure 14:
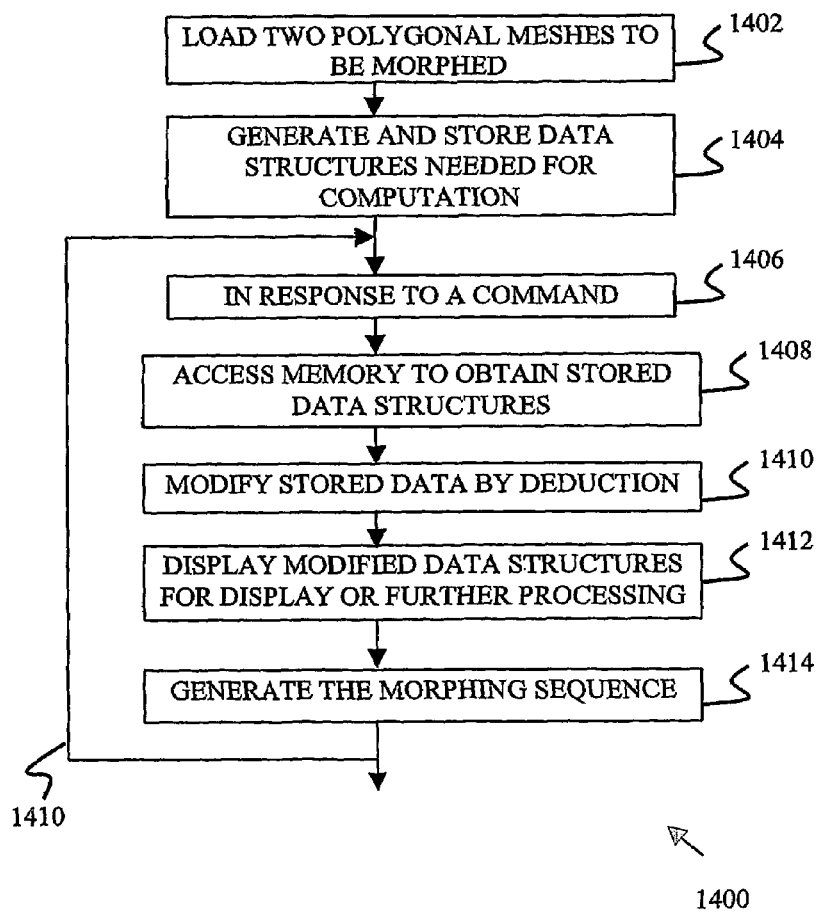
FIG. 14 is a flowchart that depicts the operation of the method of the example embodiment.

FIG. 14 is a flowchart (1400) that depicts the operation of the method of the invention in obtaining object hierarchies. First, the system loads two 3D polygonal meshes into its side-by-side windows (1402). For each of these meshes, data structures such as the connectivity graphs (FIG. 4) are generated (1404). The input models and all the necessary data structures are stored in the memory as shown in FIG. 2. At this point, the system is ready to begin an interactive display session with a user.

A user can issue commands (1406) to, for example, display components, patches or skeletons and specify local and global correspondences (FIG. 5). Also, the user can interactively modify components, patches, skeletons, correspondences, and the system accesses the memory to obtain the suitable data structures (1408), perform deductions to modify relevant data (1410), and pass them to the graphics subsystem for display of the data structures (1412) on the display screen (FIG. 5). The end result of the method is a morph sequence between two input meshes (1414). The user can choose to issue commands (return loop 1416) to adjust the morph through trial and error.

Figure 15:
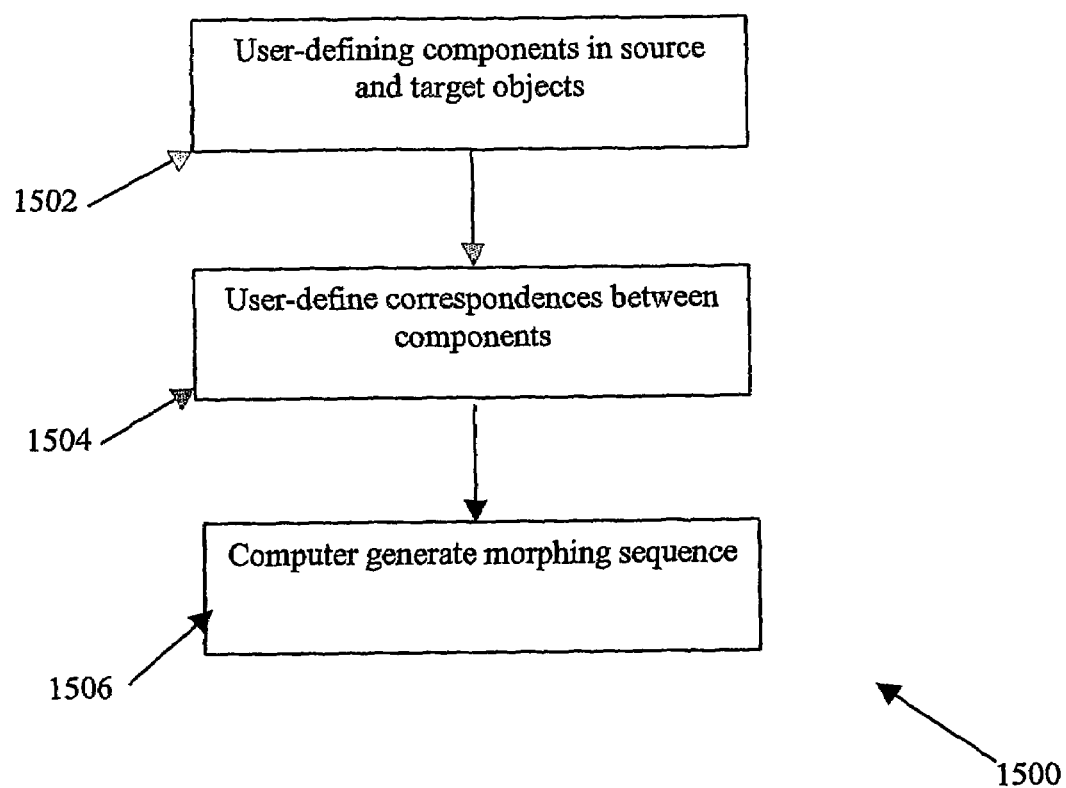
FIG. 15 is a flowchart depicting the operation of the method of another example embodiment.

FIG. 15 is a flowchart 1500 depicting the operation of a method in another example embodiment. It comprises the step 1502 of user-defining respective components in a source object and a target object respectively. At step 1504, corresponding components are user-defined between the source object and the target object. At step 1506, a computerize generation of a morphing sequence from the source object to the target object is performed.

The example embodiment described herein overcomes the limitations of the prior works and seeks to facilitate user control throughout the morphing process. It utilizes components of objects to achieve such a goal and even an amateur can use it to design a morph with ease. In this invention, morphing of polygon meshes can be decomposed into morphing of components. The technical uniqueness of our invention lies in multi-level user control through the use of components, and the deduction and assistance to make user control easy. Specifically, major contributions of this invention are as follows:

(1) Multi-Level Correspondence Control

Using components, users can directly specify global-level correspondences to represent their high-level requirements, without resorting to the more tedious low-level vertex pairing. Yet, when fine control is required, users can specify local-level correspondences over feature vertices, feature lines and feature loops for corresponding components. Thus, users can enjoy the convenience of dealing with components at the global level, without compromising finer control at the local level.

(2) Interactive and Flexible User Control

Users usually adopt a trial-and-error procedure to obtain desirable morphs. To flexibly support such activities at the global level, we utilize a novel constraint tree to provide probable counterparts for user-selected components, maintain user specifications after modifications to components and correspondences, and finally deduce correspondences over all components. At the local level, the invention derives those local-level correspondences not stated but implied by user specifications. In addition, it adds assumed correspondences where appropriate to improve the morphs.

(3) Multi-Level Interpolation Control

Users can edit trajectories by operating on components as a whole. Trajectories over individual vertices can be deduced accordingly. This allows users to control the interpolation step quickly and easily at the global level. When local-level control is desired, trajectories of individual vertices can also be specified.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

REFERENCES

[ACL00] M. Alexa, D. Cohen-Or and D. Levin, "As-rigid-as-possible Shape Interpolation", SIGGRAPH'00, 157-164, 2000.
[AHU83] A. V. Aho, J. E. Hopcroft and J. D. Ullman, "Data Structures and Algorithms", Addison-Wesley, 1983.
[DG96] D. DeCarlo and J. Gallier, "Topological Evolution of Surfaces", Graphics Interface '96, 194-203, 1996.
[GSL98] A. Gregory, A. State, M. C. Lin, D. Manocha and M. A. Livingston, "Feature-based Surface Decomposition for Correspondence and Morphing between Polyhedra", Computer Animation '98, 64-71, 1998.
[KSK00] T. Kanai, H. Suzuki and E. Kimura, "Metamorphosis of Arbitrary Triangular Meshes", IEEE CG&A, 62-75, 2000.
[LWT01] X. T. Li, T. W. Woon, T. S. Tan and Z. Y. Huang, "Decomposing Polygon Meshes for Interactive Applications", I3DG'01, 35-42, 2001.
[VL99] A. Verroust and F. Lazarus, "Extracting Skeletal Curves from 3D Scattered Data", Shape Modeling International '99, v16, 194-201, 1999.
[ZSH00] M. Zöckler, D. Stalling and H. Hege, "Fast and Intuitive Generation of Geometric Shape Transitions", Visual Computer, v16, 241-253, 2000.

The invention claimed is:

1. A method of generating a morphing sequence utilizing a computer, the method comprising the steps of:
    determining global-level corresponding components between a source object and a target object, wherein each of said components comprises a plurality of local features of respective source and target meshes representing the source and target objects and wherein said determining comprises one or both of user-specified correspondences and computer-deduced correspondences;
    determining corresponding local features between the corresponding components; and
    calculating local feature interpolation for said corresponding local features between the corresponding components,
wherein computer-deducing of the correspondences comprises maintaining a data structure, in a data storage medium, that represents information on decompositions and on connectivities between components in the source and target objects, respectively.

2. The method as claimed in claim 1, wherein the step of maintaining the data structure in the data storage medium comprises the step of maintaining data representing the user-defined correspondences between components in a constraint tree structure.

3. The method as claimed in claim 2, further comprising the step of computer-deducing extensions to the constraint tree structure to a point where each leaf of the constraint tree structure comprises data representing a single pair of corresponding components and an associated single pair of corresponding connections in the source and target meshes respectively.

4. A method as claimed in claim 3, wherein one or more of the single pairs of corresponding components and corresponding connections comprise null-elements as one of the elements of the pair.

5. The method as claimed in claims 3, further comprising the step of presenting candidate components correspondences based on the pairs of corresponding components in the leaves of the constraint tree structure to the user.

6. The method as claimed in claim 5, wherein the step of providing the candidate counterparts comprises identifying components in the target object that exhibit a substantially similar connectivity to other components in the target object compared to the user-selected component in the source object to other components in the source object.

7. The method as claimed in claim 2, further comprising the step of computer-generating data representing a common connectivity graph for the source and target object pair based on pairs of corresponding components and associated pairs of connections in the leaves of the constraint tree structure.

8. The method as claimed in claim 7, wherein in the common connectivity graph, each node represents a single pair of corresponding components, and each edge represents a single pair of connections.

9. The method as claimed in claim 7, further comprising the step of computer-deriving correspondences of a series of local features based on the data representing the common connectivity graph.

10. The method as claimed in claim 1, comprising the step of user-defining a section of the source object as corresponding to a section of the target object, wherein the respective sections extend over at least portions of two or more components of the source and target objects respectively.

11. The method as claimed in claim 10, further comprising the step of computer-deriving correspondences of the components in the source and target object respectively based on the user-defined correspondences of the sections of the source and target objects respectively.

12. The method as claimed in claim 1, wherein the local features comprise one or more of a group comprising a mesh vertex, a mesh line, and a mesh loop.

13. The method as claimed in claim 1, wherein one component in the source object is user-defined as corresponding to a plurality of components of the target object, and vice versa.

14. The method as claimed in claim 1, wherein respective components in the source and target objects comprise a group of polygons in the respective source and target meshes.

15. The method as claimed in claim 1, wherein component decompositions of the source and target meshes are obtained automatically via decomposing tools or manually via interactive system tools of cutting component with a cutting plane, selecting triangles to form a new component, passing triangles to a neighboring component, and merging connected components into one.

16. The method as claimed in claim 15, wherein a rule of processing constraints in the constraint tree structure may comprise conducting the steps of:
    given a (P, Q) corresponding to a constraint (X, Y), where $P=G(X, E)$, $Q=G(Y, F)$, $X \subseteq V_S$, $Y \subseteq V_T$, $E \subseteq E_S$ and $F \subseteq E_T$, partition each $(P_i, Q_i)$ of the current correspondence set $\square$ into $(P_i', Q_i')$ and $(P_i'', Q_i'')$, where $P_i'=P \cap P_i$, $Q_i'=Q \cap Q_i$, $P_i''=P_i-P_i'$ and $Q_i''=Q_i-Q_i'$.

17. The method as claimed in claim 16, wherein the step of constraint processing comprises the steps of, whenever a partitioning of $(P_i, Q_i)$ is performed upon the specification of a new constraint, update the constraint tree structure by creating a left child and a right child for the node representing $(P_i, Q_i)$, which correspond to the new correspondences $(P_i', Q_i')$ and $(P_i'', Q_i'')$ respectively.

18. The method as claimed in claim 1, further comprising one or more of a group of modification steps to a constraint tree structure comprising:

undoing a specific constraint with all other constraints unaffected;

splitting components during the process of specifying component correspondences; and merging components during the process of specifying component correspondences.

19. The method as claimed in claim 18, wherein the step of undoing a specific, $i^{th}$, constraint comprises merging the two respective left (right, respectively) subtrees of every pair of two nodes at level i with the same parent to be the new left (right, respectively) subtree of $n_p$.

20. The method as claimed in claim 18, wherein the step of splitting a component into two comprises the steps of:
 finding the leaf that contains the component to be split;
 replacing it with two new components; and
 updating connections accordingly.

21. The method as claimed in claim 18, wherein the step of merging two connected components into one comprise the steps of:
 while there exists a constraint that cause the separation of the two components
 locate the leaves containing the two components to be merged;
 search upward from the leaf level to find their nearest common ancestor; and
 remove the constraint that is represented by the level below this common ancestor via the undoing step;
 replace the components to be merged with the new component and update connections accordingly.

22. The method as claimed in claim 21, comprising the step of identifying candidates for user-selected sections comprising the steps of:
 within each leaf of the constraint tree, organize its components into groups of maximally connected components;
 for each user-selected component in one connectivity graph
 locate the leaf containing this component;
 within the leaf, find the group of maximally connected components that is similar in connectivity to the group containing the component; and
 add all components in the found group into the list of candidates.

23. The method as claimed in claim 1, wherein the method further comprises the steps of computing a complete vertex correspondence to associate vertices of the said meshes.

24. The method as claimed in claim 23, wherein a user specifies different kinds of local features including feature vertices, feature lines and feature loops within a pair of corresponding components.

25. The method as claimed in claim 23, wherein the step of deducing local feature pairs comprises the steps of:
 deducing implied local feature pairs from user specification; and
 deducing assumed local feature pairs.

26. The method as claimed in claim 25, wherein the step of deducing implied local feature pairs further comprises:
 deducing local feature pairs from complete component correspondences; and/or
 deducing local feature pairs upon user specification of local feature pairs.

27. The method as claimed in claim 26, wherein the step of deducing local feature pairs from the complete component correspondence comprises pairing up two component boundaries whenever they are represented by two connections in a correspondence edge.

28. The method as claimed in claim 26, wherein the step of deducing local feature pairs upon user specification of local feature pairs comprises duplicating two local features in two corresponding components in the neighboring components to form another local feature pair when the two local features are both specified at boundaries and the two neighbors at these two boundaries are also corresponding.

29. The method as claimed in claim 25, wherein the step of deducing assumed local feature pairs further comprises one or more steps of a group comprising:
 deducing pairs of tip vertices;
 deducing feature vertex pairs at corresponding feature loops; and
 deducing feature loop pairs at component boundaries.

30. The method as claimed in claim 29, wherein the step of deducing pairs of tip vertices comprises locating and pairing the tip vertices of two corresponding components when the two components each have only one boundary.

31. A system for generating a morphing sequence, the system comprising:
 means for determining global-level corresponding components between a source object and a target object, wherein each of said components comprises a plurality of local features of respective source and target meshes representing the source and target objects and wherein said determining comprises an interface for user-defined correspondences, a processor unit for computer-deducing correspondences, or both;
 means for determining corresponding local features between the corresponding components;
 means for calculating local feature interpolation for said corresponding local features between the corresponding components,
wherein the processor unit computer-deduces the correspondences by maintaining a data structure in a data storage medium of the system that represents information on decompositions and on connectivities between components in the source and target objects respectively.

32. The system as claimed in claim 31, wherein the processor unit maintains data representing the user-defined correspondences between components and connectivities in a constraint tree structure.

33. The system as claimed in claim 32, wherein the processor unit further presents candidate components correspondences based on the pairs of corresponding components in the leaves of the constraint tree structure to the user.

34. The system as claimed in claim 33, wherein the processor unit provides the candidate counterparts by identifying components in the target object that exhibit a substantially similar connectivity to other components in the target object compared to the user-selected component in the source object to other components in the source object.

35. The system as claimed in claim 32, wherein the processor unit further generates data representing a common connectivity graph for the source and target object pair based on the pairs of corresponding components and the associated pairs of connections in the leaves of the constraint tree structure.

36. The system as claimed in claim 35, wherein in the common connectivity graph, each node represents a single pair of corresponding components, and each edge may represents a single pair of connections.

37. The system as claimed in claim 35, wherein the processor unit further derives correspondences of a series of local features based on the data representing the common connectivity graph.

38. The system as claimed in claim 31, wherein the processor unit further deduces extensions to the constraint tree structure to a point where each leaf of the constraint tree structure comprises data representing a single pair of corresponding components and an associated single pair of corresponding connections in the source and target meshes respectively.

39. The system as claimed in claim 38, wherein one or more of the single pairs of corresponding components and corresponding connections comprise null-elements as one of the elements of the pair.

40. The system as claimed in claim 31, further comprising a user-interface for user-defining a section of the source object as corresponding to a section of the target object, wherein the respective sections extend over at least portions of two or more components of the source and target objects respectively.

41. The system as claimed in claim 40, wherein further comprising a processor unit for deriving correspondences of the components in the source and target object respectively based on the user-defined correspondences of the sections of the source and target objects respectively.

42. The system as claimed in claim 41, wherein the processor unit identifies candidates for user-selected sections by performing the steps of:
   within each leaf of the constraint tree, organize its components into groups of maximally connected components;
   for each user-selected component in one connectivity graph
   locate the leaf containing this component;
   within the leaf, find the group of maximally connected components that is similar in connectivity to the group containing the component; and
   add all components in the found group into the list of candidates.

43. The system as claimed in claim 41, wherein the user-interface is arranged for user-specifying local-level correspondences for a pair of corresponding components from the computed said complete component correspondence; and the processor unit may be arranged for computer-deducing local feature correspondences within a component pair; and computing the complete vertex correspondence to associate vertices of the said meshes.

44. The system as claimed in claim 41, wherein the user-interface may be arranged for user-specifying different kinds of local features including feature vertices, feature lines and feature loops within a pair of corresponding components.

45. The system as claimed in claim 41, wherein the processor unit deduces local feature pairs by performing the steps of:
   deducing implied local feature pairs from user specification; and
   deducing assumed local feature pairs where appropriate.

46. The system as claimed in claim 45, wherein the processor unit computes the complete vertex correspondence by performing the steps of:
   automatically partitioning two corresponding components into compatible patch layouts when neither component is a null-component;
   automatically handling the case where a component pair contains a null-component; and
   establishing the common mesh connectivity of the said two input meshes by parameterizing them according to their said compatible patch layouts.

47. The system as claimed in claim 46, wherein the automatic patch partitioning for two corresponding components comprises the steps of:
   organizing all local features of each component into a set of feature groups, wherein each feature group is a maximally connected group of local features;
   constructing a minimum spanning tree (MST) to connect all the feature groups in one component;
   constructing another MST to connect all the feature groups in the leaf nodes of the MST;
   partitioning the component with two MSTs into patches; and
   partitioning the corresponding component into patches according to local feature correspondences.

48. The system as claimed in claim 46, wherein the automatic handling of each component pair containing a null-component patch comprises the steps of:
   for the component pair $(c_s, c_t)$ where without loss of generality, assume $c_s \neq \zeta_v$, $c_t = \zeta_v$, $c_s'$ connects $c_s$ at boundary $l_s$, $c_s' \neq \zeta_v$, and $(c_s', c_t')$ is a component pair;
   if $c_t' \neq \zeta_v$, and the user assign a local feature $l_t$ in $c_t'$ to be the counterpart of $l_s$, create the mesh connectivity of a new component c by copying the topology of $c_s$;
   for each vertex pair $(v_s, v_t)$ where $v_s$ is from $c_s$ and $v_t$ is from c if $v_s$ is at $l_s$, $v_t$ is already a vertex of $l_t$;
   otherwise, $v_t$ is set at the position of v where (u, v) is a vertex pair and u is the boundary vertex closest to $v_s$;
   replace $c_t$ with c;
   otherwise merge $c_s$ into $c_s'$.

49. The system as claimed in claim 41, wherein the processor unit establishes a common mesh connectivity by topological merging via barycentric mapping, or multi-resolution re-meshing.

50. The system as claimed in claim 42, wherein the user-interface comprises interactive system tools of cutting component with a cutting plane, selecting triangles to form a new component, passing triangles to a neighboring component, and merging connected components into one.

51. The system as claimed in claim 31, wherein the local features comprise one or more of a group comprising a mesh vertex, a mesh line, and a mesh loop.

52. The system as claimed in claim 31, wherein the system is arranged for interpolating vertices of the source and target meshes.

53. The system as claimed in claim 52, wherein the step of interpolation comprises the steps of:
   user-editing trajectories of the said components by operating on each component as a whole;
   user-editing trajectories of vertices by changing their positions; and
   computing the interpolation for mesh vertices.

54. A data storage medium having stored thereon computer readable code means for instructing a computer to execute a method of generating a morphing sequence, the method comprising the steps of:
   determining global-level corresponding components between a source object and a target object, wherein each of said components comprises a plurality of local features of respective source and target meshes representing the source and target objects and wherein said determining comprises one or both of user-specified correspondences and computer-deduced correspondences;
   determining corresponding local features between the corresponding components;
   calculating local feature interpolation for said corresponding local features between the corresponding components,
   wherein computer-deducing of the correspondences comprises maintaining a data structure in a data storage medium, that represents information on decompositions and on connectivities between components in the source and target objects respectively.

* * * * *